(12) United States Patent
Joseph et al.

(10) Patent No.: US 11,665,759 B2
(45) Date of Patent: May 30, 2023

(54) MAC-CE DESIGN AND POWER HEADROOM CONSIDERATIONS FOR PDCP DUPLICATION ENHANCEMENTS

(71) Applicant: QUALCOMM Incorporated, San Diego, CA (US)

(72) Inventors: Vinay Joseph, Calicut (IN); Rajat Prakash, San Diego, CA (US); Sitaramanjaneyulu Kanamarlapudi, San Diego, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/061,498

(22) Filed: Oct. 1, 2020

(65) Prior Publication Data

US 2021/0105844 A1    Apr. 8, 2021

Related U.S. Application Data

(60) Provisional application No. 62/910,301, filed on Oct. 3, 2019.

(51) Int. Cl.
| | |
|---|---|
| *H04W 56/00* | (2009.01) |
| *H04W 76/15* | (2018.01) |
| *H04W 80/02* | (2009.01) |
| *H04W 76/27* | (2018.01) |
| *H04W 80/08* | (2009.01) |
| *H04W 72/23* | (2023.01) |
| *H04W 84/18* | (2009.01) |

(52) U.S. Cl.
CPC ........... *H04W 76/15* (2018.02); *H04W 72/23* (2023.01); *H04W 76/27* (2018.02); *H04W 80/02* (2013.01); *H04W 80/08* (2013.01); *H04W 84/18* (2013.01)

(58) Field of Classification Search
CPC ... H04W 76/15; H04W 76/27; H04W 72/042; H04W 80/02; H04W 80/08; H04W 84/18
USPC ........................................................ 370/329
See application file for complete search history.

(56) References Cited

U.S. PATENT DOCUMENTS

| | | |
|---|---|---|
| 2018/0309660 A1 | 10/2018 | Loehr et al. |
| 2018/0310202 A1* | 10/2018 | Löhr ..................... H04W 76/27 |
| 2018/0324642 A1 | 11/2018 | Yu et al. |

(Continued)

OTHER PUBLICATIONS

International Search Report and Written Opinion—PCT/US2020/054057—ISA/EPO—dated Jan. 29, 2021.

*Primary Examiner* — Sai Ming Chan
(74) *Attorney, Agent, or Firm* — Arent Fox, LLP

(57) ABSTRACT

A user equipment (UE) may utilize multiple radio link control (RLC) entities to duplicate packet data convergence protocol (PDCP) packets for improved reception. The UE may receive a configuration for dual connectivity with a master cell group and with a secondary cell group, wherein the configuration identifies a plurality of configured RLC entities, each RLC entity being associated with one of the master cell group or the secondary cell group. The UE may receive, at the UE, an indication of an activation status for each of at least a first subset of the configured RLC entities from one cell group of the master cell group or the secondary cell group. The UE may set the activation status of each of the first subset of the configured RLC entities that are associated with the one cell group from which the indication is received based on the indication.

23 Claims, 15 Drawing Sheets

(56) References Cited

U.S. PATENT DOCUMENTS

2020/0107392 A1 4/2020 Yi et al.
2021/0014728 A1* 1/2021 Kuo .................... H04B 17/318

* cited by examiner

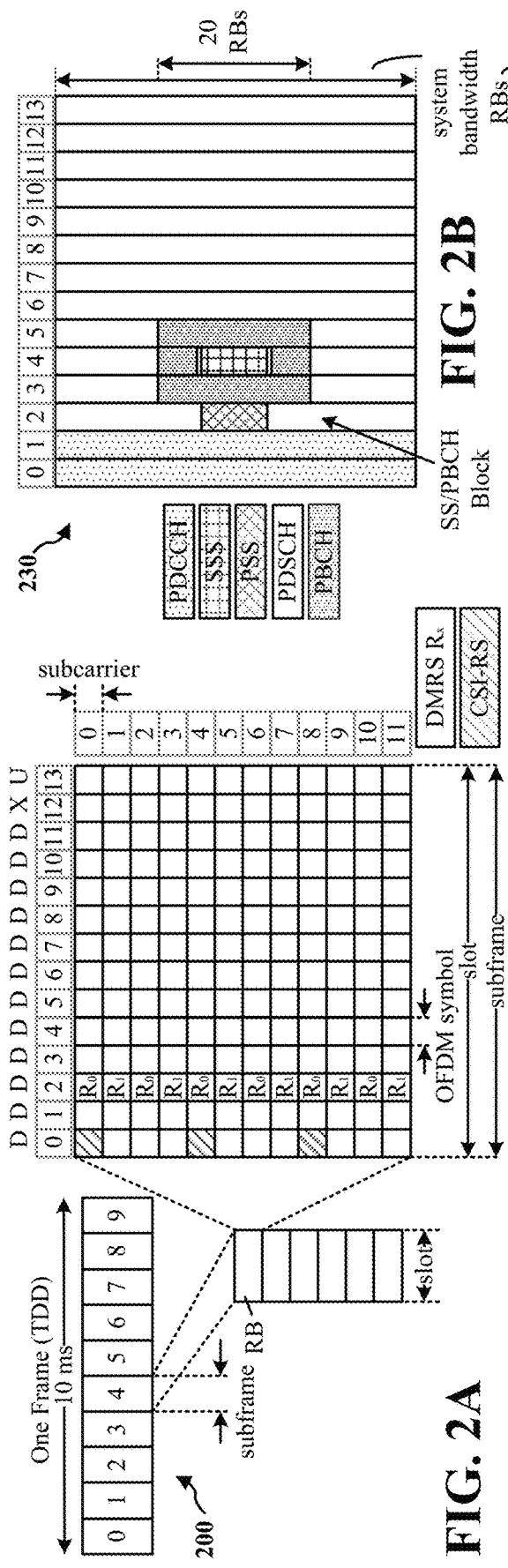
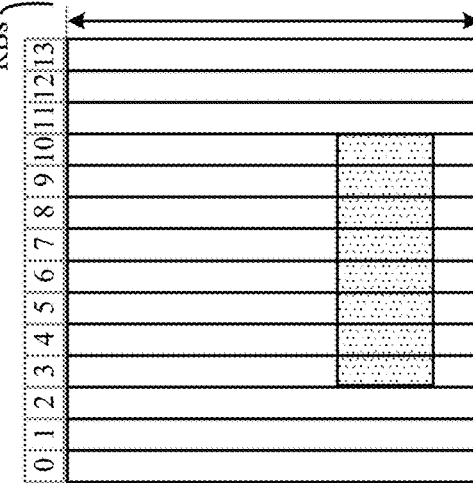
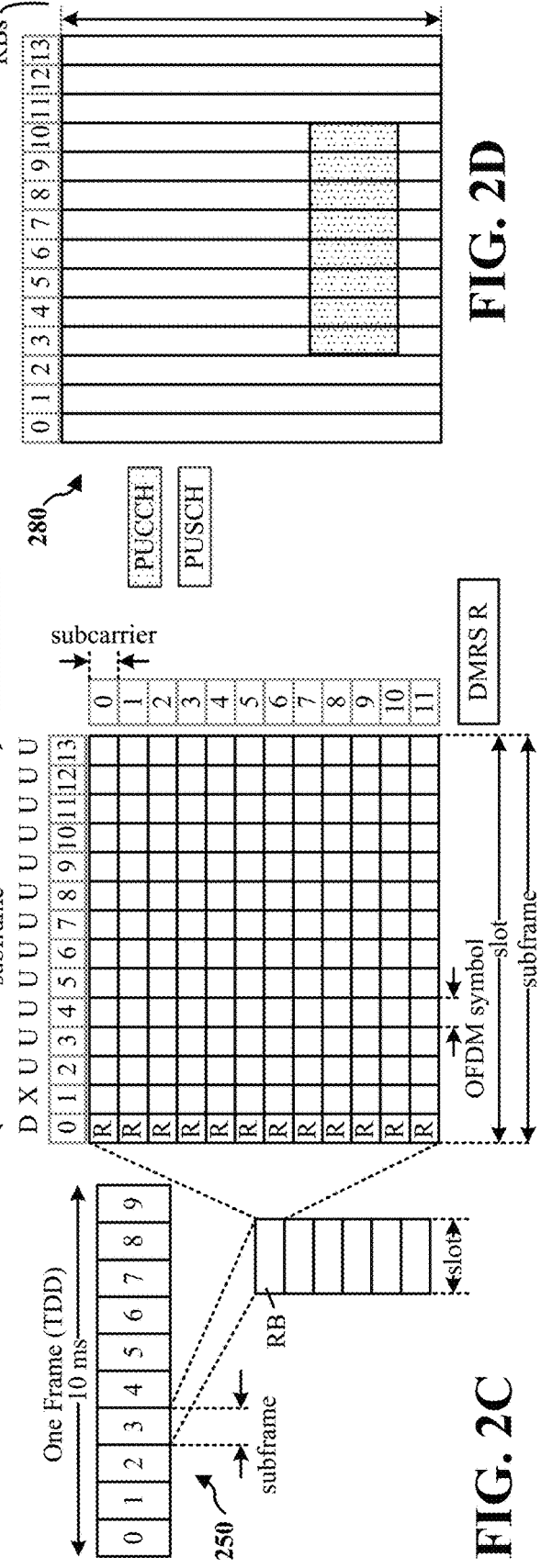
FIG. 2A
FIG. 2B
FIG. 2C
FIG. 2D

MAC-CE DESIGN AND POWER HEADROOM CONSIDERATIONS FOR PDCP DUPLICATION ENHANCEMENTS

CROSS REFERENCE TO RELATED APPLICATIONS

This application claims priority to U.S. Provisional Application No. 62/910,301 titled "MAC-CE DESIGN AND POWER HEADROOM CONSIDERATIONS FOR PDCP DUPLICATION ENHANCEMENTS," filed Oct. 3, 2019, which is assigned to the assignee hereof, and incorporated herein by reference in its entirety.

BACKGROUND

Technical Field

The present disclosure relates generally to communication systems, and more particularly, to MAC CE design and power headroom considerations for PDCP duplication enhancements.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory and at least one processor coupled to the memory. The processor may be configured to receive, at a user equipment (UE), a configuration for dual connectivity with a master cell group and with a secondary cell group, wherein the configuration identifies a plurality of configured radio link control (RLC) entities, each RLC entity being associated with one of the master cell group or the secondary cell group. The processor may be configured to receive, at the UE, an indication of an activation status for each of at least a first subset of the configured RLC entities from one cell group of the master cell group or the secondary cell group. The processor may be configured to set the activation status of each of the first subset of the configured RLC entities that are associated with the one cell group from which the indication is received based on the indication.

In another aspect, a method, a computer-readable medium, and an apparatus are provided. The apparatus may include a memory and at least one processor coupled to the memory. The processor may be configured to receive, at a UE, a configuration identifying a plurality of configured RLC entities including a primary RLC entity. The processor may be configured to receive a media access control (MAC) control element (CE) indicating a dynamic change to a new primary RLC entity.

In another aspect, a method, a computer-readable medium, and an apparatus are provided. The apparatus may include a memory and at least one processor coupled to the memory. The processor may be configured to receive, at a user equipment, a configuration identifying a plurality of configured RLC entities. The processor may be configured to autonomously determine, by the user equipment, whether to send a copy of an uplink packet data convergence protocol (PDCP) protocol data unit (PDU) to an RLC entity of the configured RLC entities.

In another aspect, a method, a computer-readable medium, and an apparatus are provided. The apparatus may include a memory and at least one processor coupled to the memory. The processor may be configured to transmit, from a base station to a UE, a configuration for dual connectivity with a master cell group and with a secondary cell group, wherein the configuration identifies a plurality of configured RLC entities, each RLC entity being associated with one of the master cell group or the secondary cell group, wherein the base station is a member of one of the master cell group or the secondary cell group. The processor may be configured to determine an activation status of each of a first subset of the configured RLC entities that are associated with the cell group of the base station. The processor may be configured to transmit, to the UE, an indication of an activation status for each of at least the first subset of the configured RLC entities associated with the cell group of the base station.

In another aspect, a method, a computer-readable medium, and an apparatus are provided. The apparatus may include a memory and at least one processor coupled to the memory. The processor may be configured to transmit, from a base station to a UE, a configuration identifying a plurality of configured RLC entities including a primary RLC entity. The processor may be configured to transmit a MAC CE indicating a dynamic change to a new primary RLC entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of DL channels within a subframe, in accordance with certain aspects of the present description.

FIG. 2C is a diagram illustrating an example of a second frame, in accordance with certain aspects of the present description.

FIG. 2D is a diagram illustrating an example of UL channels within a subframe, in accordance with certain aspects of the present description.

DETAILED DESCRIPTION

Figure 1:
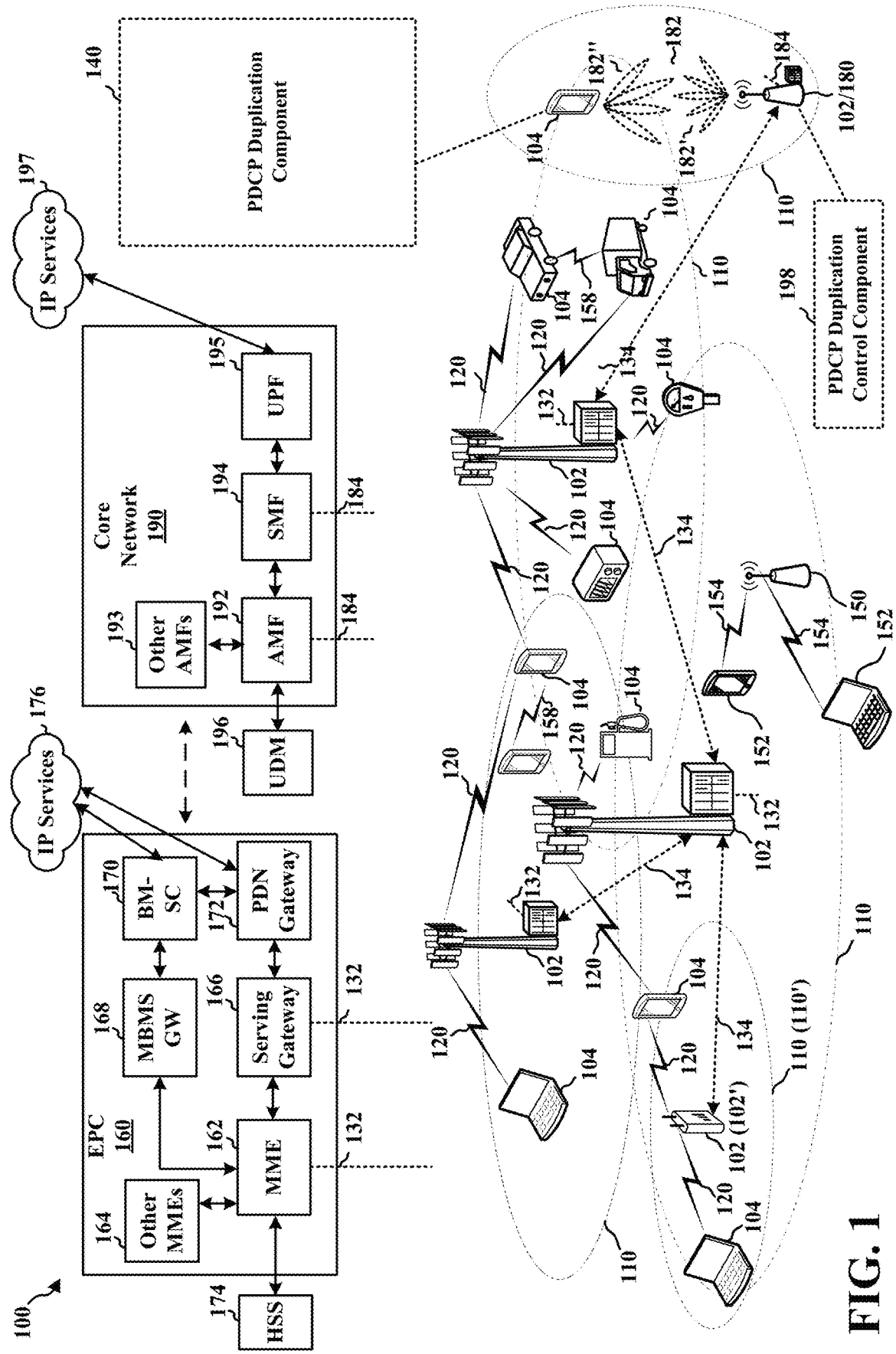
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PDCP duplication component 140 configured to receive, at a UE, a configuration for dual connectivity with a master cell group and with a secondary cell group, wherein the configuration identifies a plurality of configured RLC entities, each RLC entity being associated with one of the master cell group or the secondary cell group; receive, at the UE, an indication of an activation status for each of at least a first subset of the configured RLC entities from one cell group of the master cell group or the secondary cell group; and set the activation status of each of the first subset of the configured RLC entities that are associated with the one cell group from which the indication is received based on the indication. In another aspect, the PDCP duplication component 140 may be configured to receive, at a UE, a configuration identifying a plurality of configured RLC entities including a primary RLC entity; and receive a MAC CE indicating a dynamic change to a new primary RLC entity. In another aspect, the PDCP duplication component 140 may be configured to receive, at a user equipment, a configuration identifying a plurality of configured radio link control RLC entities; and autonomously determine whether to send a copy of an uplink PDCP PDU to an RLC entity of the configured RLC entities.

In certain aspects, the base station 102/180 may include a PDCP duplication control component 198 configured to transmit, from a base station to a UE, a configuration for dual connectivity with a master cell group and with a secondary cell group, wherein the configuration identifies a plurality of configured RLC entities, each RLC entity being associated with one of the master cell group or the secondary cell group, wherein the base station is a member of one of the master cell group or the secondary cell group; determine an activation status of each of a first subset of the configured RLC entities that are associated with the cell group of the base station; and transmit, to the UE, an indication of an activation status for each of at least the first subset of the configured RLC entities associated with the cell group of the base station. In another aspect, the PDCP duplication control component 198 may be configured to transmit, from a base station to a UE, a configuration identifying a plurality of configured RLC entities including a primary RLC entity; and transmit a MAC CE indicating a dynamic change to a new primary RLC entity.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7μ.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
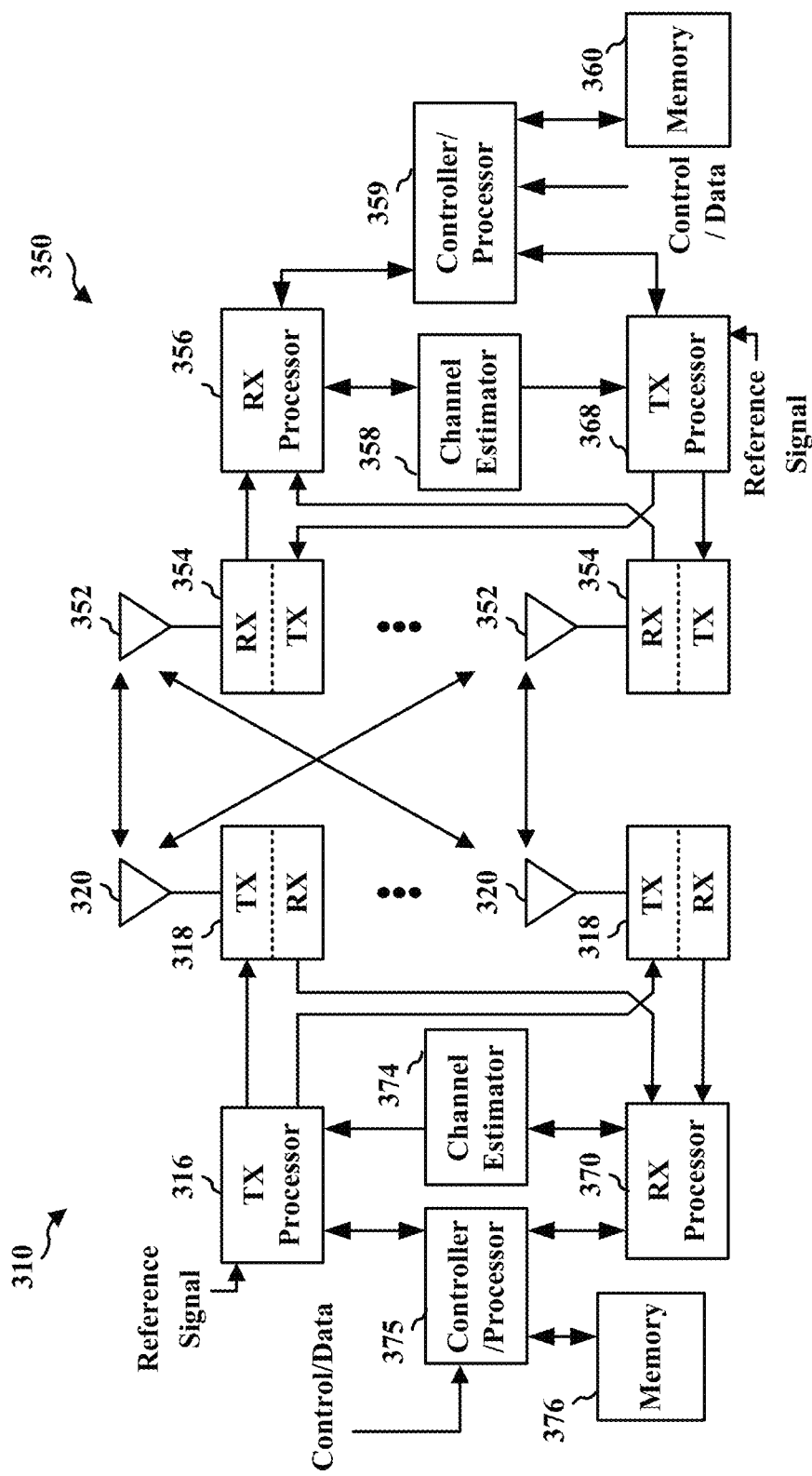
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PDCP duplication component 140 of FIG. 1.

At least one of the TX processor 316, the RX processor 370, and the controller/processor 375 may be configured to perform aspects in connection with the PDCP duplication control component 198 of FIG. 1.

As noted above, the RLC layer functionality includes error correction and retransmission. In low latency scenarios (e.g., URLLC), error correction and retransmission at the RLC layer may not meet latency requirements. One approach to improve latency of error correction and retransmission at the RLC layer is to duplicate outgoing traffic packets at the PDCP layer above the RLC layer. The duplicated traffic packets can be processed by different RLC entities and transmitted over different physical resources. For example, PDCP duplication may utilize dual connectivity and/or carrier aggregation to provide the different physical resources. At a UE, uplink PDCP duplication may be controlled by a combination of RRC configuration and MAC layer control elements (CEs) to activate/deactivate an RLC entity.

Figure 4:
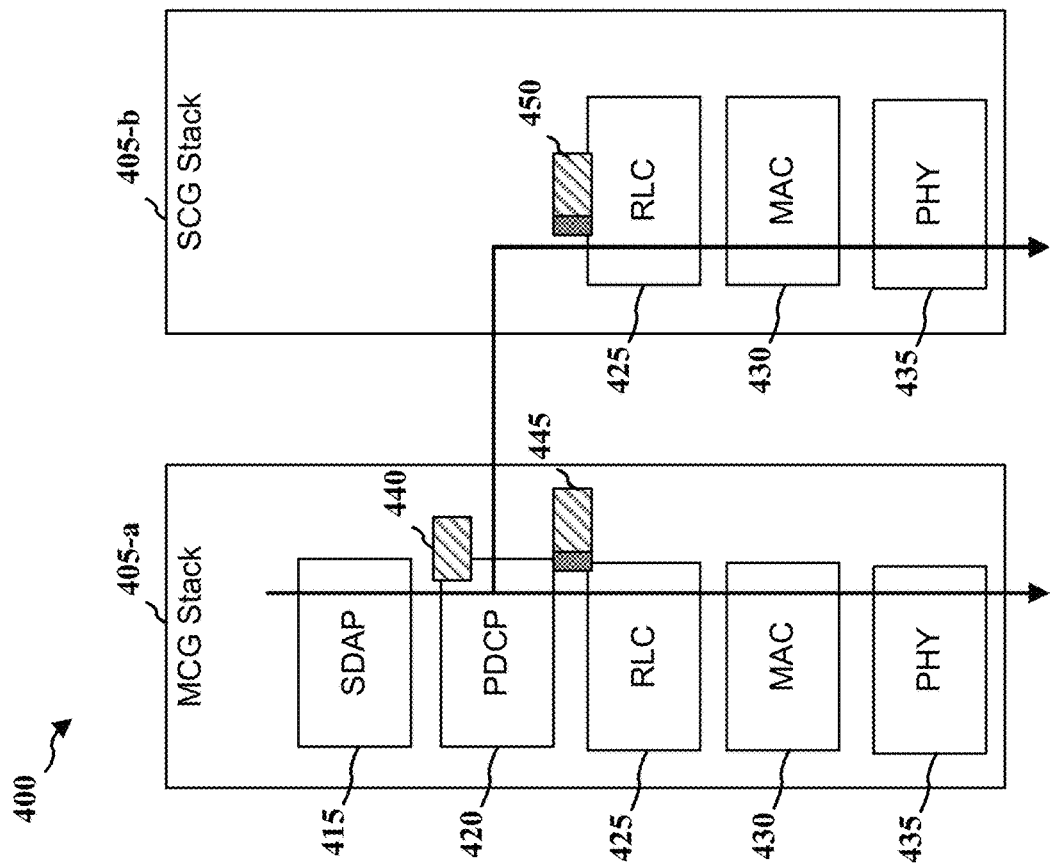
FIG. 4 is a diagram illustrating an example of an architecture for PDCP duplication using dual connectivity.

FIG. 4 illustrates an example of a protocol architecture 400 that supports packet duplication carrier enhancements in accordance with aspects of the present disclosure. The protocol architecture 400 may include protocol stacks 405-a, 405-b, which may include multiple protocol entities that may be common to both user and control planes in protocol stacks 405-a, 405-b. In some examples, the protocol architecture 400 may implement aspects of wireless communications systems and the access network 100, as described with reference to FIG. 1. For example, the protocol architecture 400 may support packet duplication, and more particularly PDCP duplication with dual-connectivity using split bearer. For example, with reference to FIG. 1, UE 104 may use protocol stack 405-a for packet transmission to one or more base stations associated with a MCG and protocol stack 405-b for packet transmission to base stations associated with a SCG. The protocol architecture 400 may therefore support packet duplication based on a configuration by a base station 102, and implemented by a UE 104 to experience reduced power consumption, improved reliability for packet transmissions, increased spectral efficiency, higher data rates and, in some examples, low latency for wireless communications, among other benefits.

In some implementations, one of the MCG or the SCG may be associated with a satellite for satellite based terrestrial communication. In some implementations, a specific RLC entity may be associated with the satellite. The satellite may include full base station functionality or may be a repeater for a base station. The satellite may operate in a different frequency band than a terrestrial base station. A satellite may move relative to the UE 104, and the UE 104 may experience different channel conditions. The ability to dynamically change an activation status of an RLC entity and/or change a primary RLC entity may be applied to a cell associated with a satellite to make use of the satellite when doing so is efficient. For example, in one scenario, the UE may be dynamically configured to duplicate packets at the PDCP layer for transmission to a terrestrial base station and a satellite for improved reliability. If the connection with the satellite experiences poor channel conditions, the associated cell group or RLC entity may be dynamically deactivated to save power, for example.

Protocol stack 405-a may include a service data adaptation protocol (SDAP) layer 415, a PDCP layer 420, a radio link control (RLC) layer 425, a medium access control (MAC) layer 430, and a physical (PHY) layer 435. Protocol stack 405-b may include similar protocol entities. For example, protocol stack 405-a may also include an RLC layer 425, a MAC layer 430, and a PHY layer 435. The multiple protocol entities may be in communication with one another via one or more radio bearers, logical channels, transport channels. For example, SDAP layer 415 and PDCP layer 420 may be in communication with RLC layer 425 via one or more radio bearers, RLC layer 425 may be in communication with MAC layer 430 via one or more logical channels, and MAC layer 430 may be in communication with PHY layer 435 via one or more transport channels. Radio bearers may include signaling radio bearers (SRB), such as SRB0, SRB1, SRB2, SRB3, etc. Examples of logical channels include broadcast control channel (BCCH), paging control channel (PCCH), common control channel (CCHH), dedicated control channel (DCCH), dedicated traffic channel (DTCH), multicast traffic channel (MCH), or multicast control channel (MCCH). Examples of transport channels include uplink shared channel (UL-SCH), downlink shared channel (DL-SCH), paging channel (PCH), broadcast channel (BCH), rand access channel (RACH).

SDAP layer 415 may support and perform various functions, for example, mapping between a quality-of-service (QoS) flow and a data radio bearer, as well as assign QoS flow identifiers to uplink packets. In some examples, SDAP layer 415 may receive uplink packet 440 and may assign uplink packet 440 to a QoS flow and a set of radio bearers to ensure that uplink packet 440 receives the correct forwarding treatment as it traverses the protocol stacks 405-a, 405-b. For example, SDAP layer 415 may forward uplink packet 440 to PDCP layer 420 according to the assigned QoS flow and the set of radio bearers. Uplink packet 440 may be a PDCP service data unit (SDU).

PDCP layer 420 may support and perform various functions, such as transfer of user data, header compression, sequence numbering, duplication detection, packet duplication, and the like. In some examples, PDCP layer 420 may receive uplink packet 440 (e.g., PDCP SDU) and may perform header compression followed by ciphering. In some examples, PDCP layer 420 may add a PDCP header carrying information for deciphering uplink packet 440. In the example of packet duplication, PDCP layer 420 may perform packet duplication on uplink packet 440 (e.g., PDCP PDU), also referred to as "PDCP duplication." As a result, PDCP layer 420 may generate uplink packets 445, 450 that may be entirely or partially equivalent (e.g., difference in radio bearer identifiers, logical channel identifiers). For example, uplink packet 445 may be associated with a radio bearer and logical channel different from uplink packet 450. In some examples, PDCP layer 420 performs packet duplication on uplink packet 440 based on an uplink packet duplication configuration, which may be an uplink PDCP duplication configuration. In some examples, PDCP layer 420 may perform packet duplication to generate a number of copies of uplink packet 440.

PDCP layer 420 may forward uplink packet 445 to RLC layer 425 in protocol stack 405-a and forward uplink packet 450 to RLC layer 425 in protocol stack 405-b. In this example, PDCP duplication may include sending more than one copy of a same PDCP PDU to lower layers (e.g., RLC layers), by sending each copy to a different RLC entity. A base station 102 may configure RLC layers 425 (e.g., of a UE 104) for sending copies of uplink packet 440 (i.e., uplink packets 445, 450). In some examples, each RLC layer 425 may have one or more logical channels associated with one or more serving cells or carriers via a logical channel mapping criteria. Each RLC layer 425 may assemble uplink packets 445, 450 (e.g., RLC SDUs) received from a corresponding PDCP layer 420 into further groups of one or more packets (e.g., RLC PDUs), and may pass the groups of packets to a corresponding MAC layer 430.

The MAC layer 430 may perform logical channel prioritization, and may assemble the groups of one or more packets (e.g., MAC SDUs) received from the RLC layers 425 into MAC PDUs (i.e., transport blocks (TBs)) that are passed to a lower layer (e.g., PHY layer 435) for transmission over a wireless interface. For example, uplink packets 445, 450 may be transmitted in parallel across multiple carriers (e.g., via carrier aggregation) or over multiple base stations 102 that each may or may not use carrier aggregation. In some examples, additionally or alternatively, uplink packets 445, 450 may be transmitted in parallel across multiple carriers on a directional beam. Protocol architecture 400 may therefore support PDCP duplication with dual-connectivity using split bearer. Example of another protocol architecture is further described in more detail herein with reference to FIG. 5.

Figure 5:
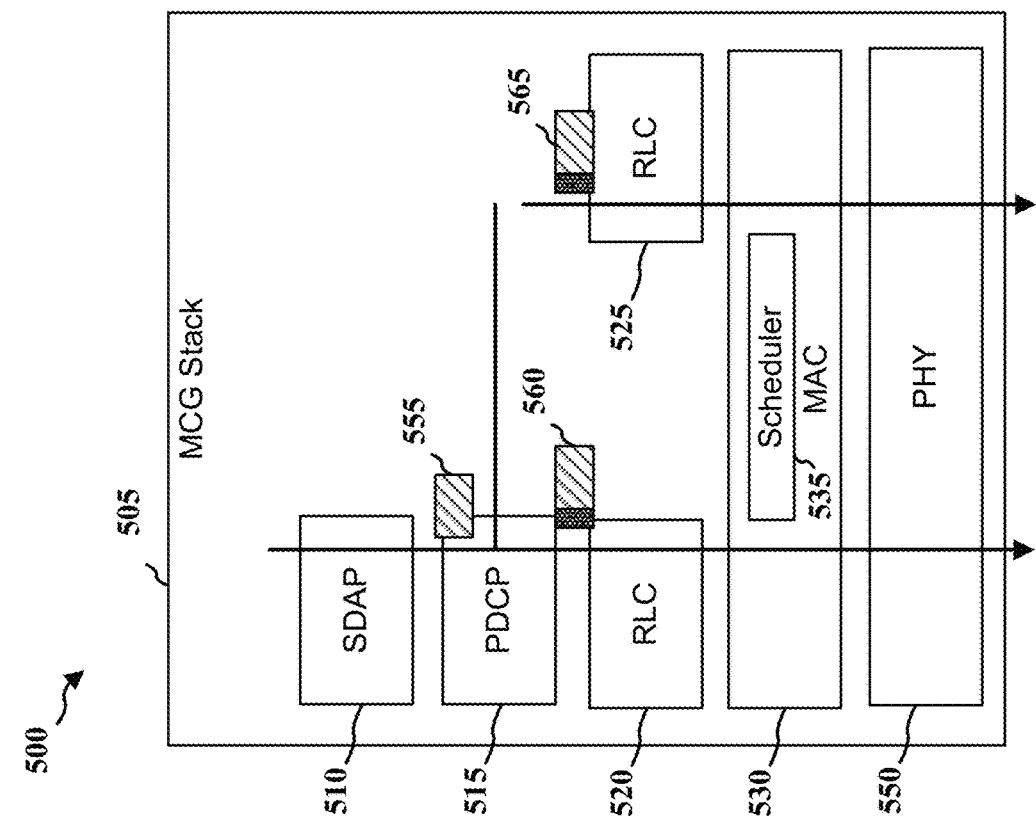
FIG. 5 is a diagram illustrating an example of an architecture for PDCP duplication using carrier aggregation.

FIG. 5 illustrates an example of a protocol architecture 500 that supports packet duplication carrier enhancements in accordance with aspects of the present disclosure. The protocol architecture 500 may include a single protocol stack 505, which may include multiple protocol entities common to both user and control planes in protocol stack 505. In some examples, the protocol architecture 500 may implement aspects of wireless communications systems and the access network 100, as described with reference to FIG.

1. For example, the protocol architecture 500 may support packet duplication, and more particularly PDCP duplication with carrier aggregation. For example, with reference to FIG. 1, UE 104 may use protocol stack 505 for transmission of multiple copies of a packet to base station 102 via carrier aggregation. The protocol architecture 500 may therefore support packet duplication based on a configuration by a base station 102, and implemented by a UE 104 to experience reduced power consumption, improved reliability for packet transmissions, increased spectral efficiency, higher data rates and, in some examples, low latency for wireless communications, among other benefits.

Protocol stack 505 may include an SDAP layer 510, a PDCP layer 515, an RLC layer 520, a MAC layer 530, and a PHY layer 550. The multiple protocol entities may be in communication with one another via one or more radio bearers, logical channels, transport channels. For example, SDAP layer 510 and PDCP layer 515 may be in communication with RLC layers 520, 525 via one or more radio bearers, RLC layers 520, 525 may be in communication with MAC layer 530 via one or more logical channels, and MAC layer 530 may be in communication with PHY layer 550 via one or more transport channels. Radio bearers, logical channels, and transport channels may include one or more examples of radio bearers as described with reference to FIGS. 1 through 3.

SDAP layer 510 may support and perform various functions, for example, mapping between a QoS flow and a data radio bearer, as well as assign QoS flow identifiers to uplink packets. In some examples, SDAP layer 510 may receive uplink packet 555 and may assign uplink packet 555 to a QoS flow and a set of radio bearers to ensure that uplink packet 555 receives the correct forwarding treatment as it traverses protocol stack 505. For example, SDAP layer 510 may forward uplink packet 555 (e.g. PDCP SDU) to PDCP layer 515 according to the assigned QoS flow and the set of radio bearers.

PDCP layer 515 may support and perform various functions, such as transfer of user data, header compression, sequence numbering, duplication detection, packet duplication, and the like. In some examples, PDCP layer 515 may receive uplink packet 555 (e.g., PDCP SDU) and may perform header compression followed by ciphering. In some examples, PDCP layer 515 may add a PDCP header carrying information for deciphering uplink packet 555. In the example of packet duplication, PDCP layer 515 may perform packet duplication on uplink packet 555 (e.g., PDCP PDU). As a result, PDCP layer 515 may generate uplink packets 560, 565 that may be entirely or partially equivalent. In some examples, PDCP layer 515 performs packet duplication on uplink packet 555 based on an uplink packet duplication configuration, which may be an uplink PDCP duplication configuration. In some examples, PDCP layer 515 may perform packet duplication to generate a number of copies of uplink packet 555. The number of copies may be a minimum or maximum number of copies of uplink packet 555 to transmit.

PDCP layer 515 may forward uplink packet 560 to RLC layer 520 and uplink packet 565 to RLC layer 525. In this example, PDCP duplication may include sending more than one copy of a same PDCP PDU to lower layers (e.g., RLC layers), by sending each copy to a different RLC layer. A base station 102 may configure RLC layers 520, 525 (e.g., of a UE 104) for sending copies of uplink packet 555 (i.e., uplink packets 560, 565). In some examples, each RLC layer 520, 525 may have one or more logical channels associated with one or more serving cells or carriers via a logical channel mapping criteria. Each RLC layer 520, 525 may assemble uplink packets 560, 565 (e.g., RLC SDUs) received from PDCP layer 515 into further groups of one or more packets (e.g., RLC PDUs), and may pass the groups of packets to MAC layer 530.

MAC layer 530 may perform logical channel prioritization, and may assemble the groups of one or more packets (e.g., MAC SDUs) received from RLC layers 520, 525 into MAC PDUs (i.e., transport blocks (TBs)) that are passed to a lower layer (e.g., PHY layer 550) for transmission over a wireless interface. In some examples, MAC layer 530 may include a scheduler 535 that may support and perform various functions, such as resource allocation and handling sharing available time and frequency resources (e.g., resource blocks (RBs)) among different carriers that may carry uplink packets 560, 565. MAC layer 530 may, additionally or alternatively, include HARQ processes that may support and perform various functions, such as retransmission of uplink packets 560, 565. For example, uplink packets 560, 565 may be transmitted in parallel across multiple carriers (e.g., via carrier aggregation) or over multiple base stations 102. In some examples, additionally or alternatively, uplink packets 560, 565 may be transmitted in parallel across multiple carriers on a directional beam. Protocol architecture 500 may therefore support PDCP duplication with carrier aggregation. That is, protocol architecture 500 may have multiple RLC layers associated with a single base station supporting carrier aggregation, or related to multiple base stations, where some base stations may use or not use carrier aggregation.

Figure 6:
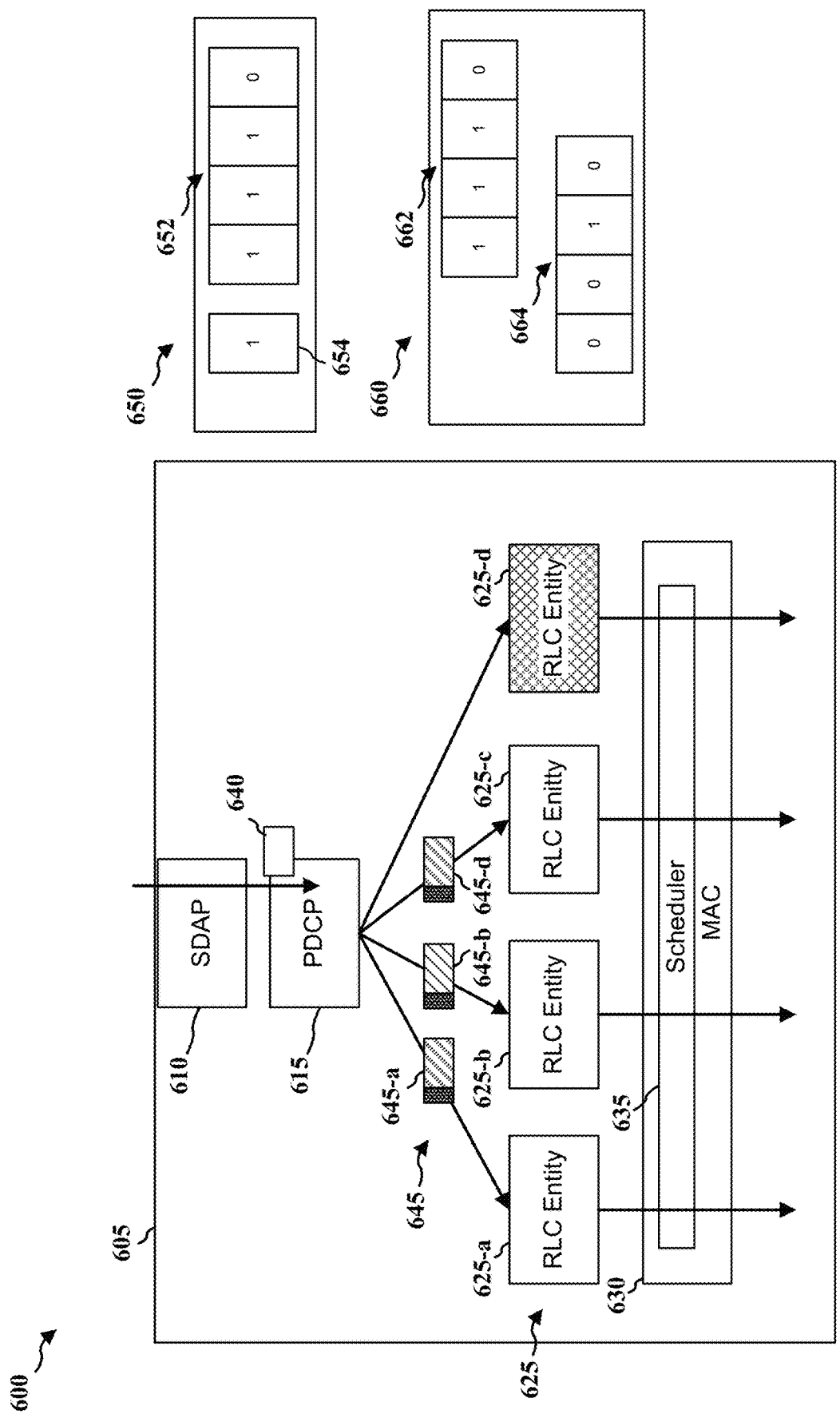
FIG. 6 is a diagram illustrating an example architecture for controlling RLC entities utilizing carrier aggregation based on indications.

FIG. 6 illustrates an example of a protocol architecture 600 that supports packet duplication carrier enhancements in accordance with aspects of the present disclosure. The protocol architecture 600 may include a single protocol stack 605, which may include multiple protocol entities common to both user and control planes in protocol stack 605. For example, the SDAP layer 610, PDCP layer 615, MAC layer 630, and scheduler 635 may be similar to the corresponding layers discussed above with respect to FIG. 5. The protocol architecture 600 may include multiple RLC entities 625 (e.g., RLC entities 625-a, 625-b, 625-c, 625-d). For example, as described above with respect to FIG. 5, the protocol architecture 600 may utilize carrier aggregation and may have an RLC entity 625 associated with each uplink component carrier. The multiple RLC entities 625 may also be referred to as "legs." The number of RLC entities 625 may be configured by the network using an RRC configuration. In the illustrated example, four RLC entities 625 are configured, but an RRC configuration may configure fewer RLC entities. Additionally, the concepts described herein may be expanded to a greater number of RLC entities. The configuration for each RLC entity may include a logical channel identifier (LCD) for the RLC entity 625.

In an aspect, each RLC entity 625 may have an activation status of either activated or deactivated. In some implementations, one RLC entity 625 may be designated as a primary RLC entity and may remain active. For PDCP duplication, two or more RLC entities 625 may be activated. For example, as illustrated, RLC entities 625-a, 625-b, and 625-c are activated and RLC entity 625-d is deactivated. The activation status of the RLC entities 625 may be changed dynamically, for example, using a MAC-CE, DCI, RLC control PDU, a PDCP control PDU, or a radio resource control (RRC) message or may be changed autonomously by the UE 104. The PDCP layer 615 may receive an uplink packet 640 (e.g., a PDCP SDU) and generate an uplink packet 645 (e.g., a PDCP PDU) for each active RLC entity 625. Accordingly, in the illustrated example, the PDCP layer 615 generates the uplink packets 645-a, 645-b, and 645-c).

In an aspect, an indication 650 of RLC entity activation status may include a bitmap 652 indicating the activation status of each RLC entity 625. For example, the bitmap 652 may have a length equal to the number of configured RLC entities (e.g., 4), and the $i^{th}$ bit may correspond to the $i^{th}$ RLC entity 625. The indication 650 may also include an additional indication 654 of PDCP duplication status. For example, the additional indication 654 may be a single bit indicating whether PDCP duplication is active or inactive. The indication 650 may be for a particular data radio bearer (DRB).

Figure 7:
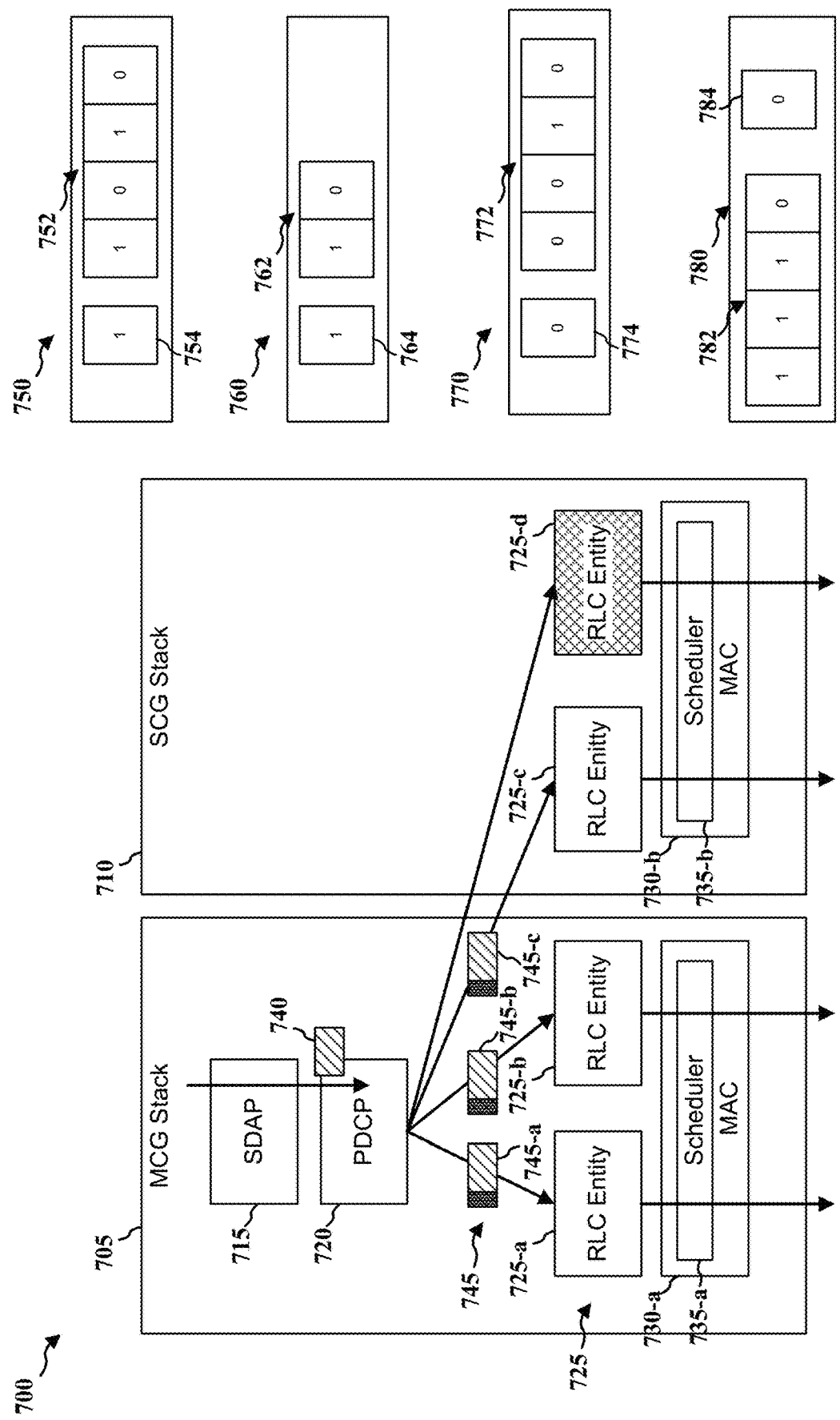
FIG. 7 is a diagram illustrating an example architecture for controlling RLC entities utilizing dual connectivity and carrier aggregation based on indications.

FIG. 7 illustrates another example of a protocol architecture 700 that supports packet duplication carrier enhancements in accordance with aspects of the present disclosure. The protocol architecture 700 may support PDCP duplication using dual connectivity and/or carrier aggregation to provide a split bearer. For example, the protocol architecture 700 may include a first stack 705 for a master cell group (MCG) and a second stack 710 for a secondary cell group (SCG). The SDAP layer 715, PDCP layer 720, MAC layers 730-a, 730-b, and schedulers 735-a and 735-b may be similar to the corresponding layers discussed above with respect to FIG. 4. The PDCP layer 720 may receive an uplink packet 740 (e.g., a PDCP SDU) and generate an uplink packet 745 (e.g., a PDCP PDU) for each active RLC entity 725. Accordingly, in the illustrated example, the PDCP layer 720 generates the uplink packets 745-a, 745-b, and 745-c) for active RLC entities 725-a, 725-b, and 725-c.

An indication of PDCP duplication activation or deactivation from by a MAC entity can indicate configuration for a DRB if RLC entities of the DRB are associated with the MAC entity. For example, a MAC CE from MAC entity of either MgNB/MCG or SgNB/SCG can indicate RLC activation configuration for split bearers. PDCP duplication activation or deactivation may pose a problem for split bearer configurations in that the MgNB/MCG and SgNB/SCG may need to be synchronized with respect to RLC activation status of all RLC entities in order to prevent conflicting indications. For example, the MgNB/MCG and SgNB/SCG may communicate via a backhaul to determine RLC entity activation status. Synchronization between MgNB/MCG and SgNB/SCG may limit quick adaptation of RLC activation status of RLC entities of a cell group (e.g., to switch to a better carrier).

In an aspect, the present disclosure provides for limiting indications of RLC entity activation/deactivation from a MAC entity of MCG or SCG to only affect RLC entities associated with the MCG or the SCG respectively. In an implementation, the MCG or SCG may indicate activation or deactivation of PDCP duplication, which may affect RLC entities associated with either the MCG or the SCG.

For example, in a first implementation, the MCG may transmit the indication 750 including a bitmap 752 indicating an activation status for each of the RLC entities 725. Since, architecture 700 is for a split bearer, the UE 104 may apply the indication 750 only to the RLC entities 725 associated with the MCG, that is RLC entities 725-a and 725-b. For instance, according to the illustrated bitmap 752, the UE 104 may deactivate the RLC entity 725-b and maintain the RLC entity 725-a in the activated state. The UE 104 may ignore the last two bits of the bitmap 752 that correspond to the RLC entities 725-c and 725-d, which are associated with the SCG. Optionally, the indication 750 may include the additional indication 754 indicating that PDCP duplication is active.

As another example, in a second implementation, the MCG may transmit the indication 760 including a bitmap 762 that has a length equal to the number of RLC entities associated with the cell group transmitting the indication (e.g., MCG). Once again, according to the illustrated bitmap 762, the UE 104 may deactivate the RLC entity 725-b and maintain the RLC entity 725-a in the activated state. Optionally, the indication 760 may include the additional indication 764 indicating that PDCP duplication is active.

As a third example, in a third implementation, the SCG may transmit the indication 770 including a bitmap 772 that has a length equal to the number of configured RLC entities. The indication 770 may indicate deactivation of the PDCP duplication. For instance, the bitmap 772 may indicate a single RLC entity 725-c should be active. Accordingly, the UE 104 may deactivate PDCP duplication in response to the bitmap 772 even though the UE 104 may generally ignore the bits indicating a status for the RLC entities associated with the cell group not sending the indication 770 (e.g., RLC entities 725-a and 725-b associated with the MCG). Optionally, the indication 770 may include the additional indication 774 indicating to deactivate PDCP duplication. For instance, the UE 104 may deactivate PDCP duplication based on the additional indication 774 even if the UE 104 ignores the bits corresponding to RLC entities 725-a and 725-b associated with the MCG.

In another aspect, an indication of activation status of RLC entities may be used to indicate a primary RLC entity. Indicating the primary RLC entity via the lower level signaling for the activation status may reduce switching time and improve flexibility for PDCP duplication configuration. In a first example, the indication of activation status may include an explicit indication of the primary RLC entity. Referring back to FIG. 6, an indication 660 may include a bitmap 662 indicating the activation status of each RLC entity 625. The indication 660 may also include a field 664 indicating the primary RLC entity. For instance, the indication 660 may be a bitmap with each bit corresponding to an index of an RLC entity with a value of '1' indicating the primary RLC entity (e.g., RLC entity 625-c). In another implementation, the field 664 may be a value indicating an index of the primary RLC entity. In a second example, the indication of activation status may implicitly indicate the primary RLC entity. Referring again to FIG. 7, an indication 780 may include a bitmap 782 indicating the activation status of each RLC entity 725 and include a field 784 indicating a cell group of the primary RLC entity. For instance, the field 784 may be a single bit. The UE 104 may select the primary RLC entity as the RLC entity 725 associated with the indicated cell group having the lowest LCD among active RLC entities associated with the cell group. For instance, the illustrated field 784 may indicate the MCG and RLC entity 725-a may have the lowest LCD. In a third example, when PDCP duplication is deactivated, the active RLC entity indicated may be selected as the primary RLC entity. For instance, in the previous example of indication 770 used to deactivate PDCP duplication, the RLC entity 725-c was left active. Accordingly, in that example, the RLC entity 725-c may be selected as the primary RLC entity.

In another aspect, the present disclosure provides for allowing the UE 104 to autonomously and dynamically control active RLC entities. For instance, network control of RLC entity activation may experience delays in network measurement collection (e.g., due to infrequent reference signals or averaging) and processing time for MAC CE or other signaling. In contrast, the UE 104 may be aware of power constraints and other factors affecting PDCP duplication. In an implementation, autonomous control of RLC entities may occur within the configuration and activation architectures discussed above. That is, the network may still configure RLC entities using RRC messages. The network may optionally provide explicit activation/deactivation indications. Additionally, the network may provide a configuration indicating whether the UE is allowed to autonomously control RLC entities. The UE may autonomously determine whether to activate/deactivate RLC entities and/or autonomously determine whether to use an active RLC entity for a particular uplink packet (e.g., PDCP PDU).

For example, the UE 104 may determine not to use (e.g., to autonomously deactivate or to not send an uplink packet 645 (e.g., PDCP PDU) to one or more active RLC entities that are power limited. A power limited RLC entity may refer to an RLC entity associated with an uplink power headroom less than a threshold. The power headroom may be based on one or more serving cells associated with the RLC entity. The serving cells associated with RLC entity can be either for uplink transmission on all cells of a cell group or on a subset of cells identified via logical channel priority (LCP) mapping restrictions for a logical channel associated with the RLC entity. The UE may optionally, additionally autonomously activate a new RLC entity that is not power limited. As another example, the UE 104 may determine to use (e.g., autonomously activate) an RLC entity upon detecting that the RLC entity is not power limited. In another example, the autonomous use may depend on a data volume pending for the RLC entity. For example, the UE 104 may autonomously use or not use an RLC entity if a data volume pending for the RLC entity is above or below a threshold. For instance, if the data volume pending for the RLC entity is above a threshold, the UE 104 may determine not to use the RLC entity for a particular uplink packet (e.g., because latency may be expected). As another example, the UE may autonomously use or not use an RLC entity depending on whether an uplink packet is a PDCP control PDU.

Figure 8:
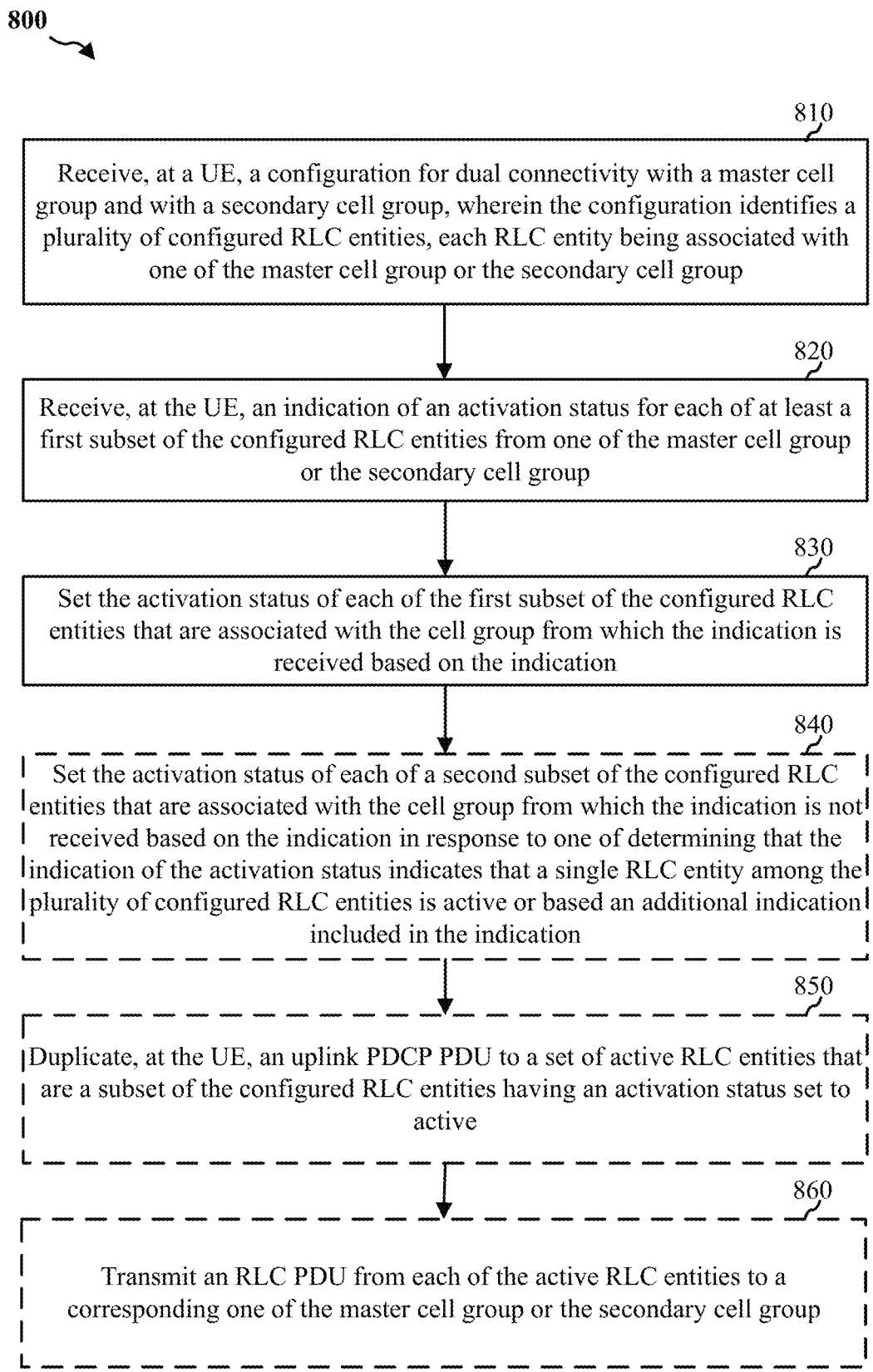
FIG. 8 is a flowchart of a method of setting active RLC entities for PDCP duplication in wireless communications.

FIG. 8 is a flowchart of a method 800 of wireless communication. The method may be performed by a UE (e.g., the UE 350, the apparatus 1102/1102; the processing system 1214, which may include the memory 360 and which may be the entire UE 350 or a component of the UE 350 such as the TX processor 368, the RX processor 356, and/or the controller/processor 359).

At block 810, the method 800 may include receiving, at a UE, a configuration for dual connectivity with a master cell group and with a secondary cell group, wherein the configuration identifies a plurality of configured RLC entities, each RLC entity being associated with one of the master cell group or the secondary cell group. In an aspect, for example, the PDCP duplication component 140 may receive, at the UE 104, a configuration for dual connectivity with a master cell group and with a secondary cell group, wherein the configuration identifies a plurality of configured RLC entities 725, each RLC entity being associated with one of the master cell group (e.g., RLC entities 725-a and 725-b) or the secondary cell group (e.g., RLC entities 725-c and 725-d). For example, the master cell group may be associated with a first base station and the secondary cell group may be associated with a second base station.

At block 820, the method 800 may include receiving, at the UE, an indication of an activation status for each of at least a first subset of the configured RLC entities from one of the master cell group or the secondary cell group. In an aspect, for example, the PDCP duplication component 140 may receive, at the UE 104, an indication (e.g., indication 750, 760, 770, 780) of an activation status for each of at least a first subset of the configured RLC entities from one of the master cell group or the secondary cell group. The indication may include an activation status for each of the configured RLC entities (e.g., bitmap 752).

At block 830, the method 800 may include setting the activation status of each of the first subset of the configured RLC entities that are associated with the cell group from which the indication is received based on the indication. In an aspect, for example, the PDCP duplication component 140 may set the activation status of each of the first subset of the configured RLC entities 725 that are associated with the cell group from which the indication is received based on the indication. In an aspect, the UE 104 ignores the activation status of configured RLC entities that are associated with the cell group from which the indication is not received. For example, the activation status may be active for one or more configured RLC entities associated with the cell group from which the indication is not received. The base station (e.g., in the MCG) may set the status of at least one RLC entity of non-sending CG (e.g., the SCG) to active so that any MAC CE which is not used for deactivation always activates more than one active RLC entity. Accordingly, the UE may distinguish between MAC CE used for deactivation (for which all activation status is applied) (e.g., indication 770) and other MAC CEs (for which only sending cell group's (CG) RLC entities' activation status is considered) (e.g., indication 750). That is, the UE 104 may not deactivate PDCP duplication based on the indication 750 because at least two active RLC entities are indicated.

At block 840, the method 800 may optionally include setting the activation status of each of a second subset of the configured RLC entities that are associated with the cell group from which the indication is not received based on the indication in response to one of determining that the indication of the activation status indicates that a single RLC entity among the plurality of configured RLC entities is active or based an additional indication included in the indication. In an aspect, for example, the PDCP duplication component 140 may set the activation status of each of a second subset of the configured RLC entities (e.g., RLC entities 725-a and 725-b) that are associated with the cell group from which the indication is not received based on the indication 770 in response to one of determining that the indication of the activation status (e.g., bitmap 772) indicates that a single RLC entity 725-c among the plurality of configured RLC entities 725 is active or based an additional indication 774 included in the indication 770. For example, the indication 770 may be sent using a MAC CE and the additional indication 774 may be sent using a bit in the MAC CE. In some aspects, the value of indication 774 may indicate whether or not the PDCP duplication component 140 sets the activation status of each of a second subset of the configured RLC entities (e.g., RLC entities 725-a and 725-b) that are associated with the cell group from which the indication is not received based on the indication 770. For instance, indication 774 may be indicated using a bit in a MAC CE and when the bit is set to one, PDCP duplication component 140 sets the activation status of each of a second subset of the configured RLC entities that are associated with the cell group from which the indication is not received based on the indication 770; and when the bit is set to zero, PDCP duplication component 140 does not set the activation status of each of a second subset of the configured RLC entities that are associated with the cell group from which the indication is not received based on the indication 770.

At block 850, the method 800 may optionally include duplicating, at the UE, an uplink PDCP PDU to a set of active RLC entities that are a subset of the configured RLC entities having an activation status set to active. In an aspect, for example, the PDCP duplication component 140 may duplicate, at the UE 104, an uplink PDCP PDU 745 to a set of active RLC entities (RLC entities 725-a, 725-b, 725-c) that are a subset of the configured RLC entities 725 having an activation status set to active.

At block 860, the method 800 may optionally include transmitting an RLC PDU from each of the active RLC entities to a corresponding one of the master cell group or the secondary cell group. In an aspect, for example, the PDCP duplication component 140 may transmit an RLC PDU from each of the active RLC entities (RLC entities 725-a, 725-b, 725-c) to a corresponding one of the master cell group or the secondary cell group.

Figure 9:
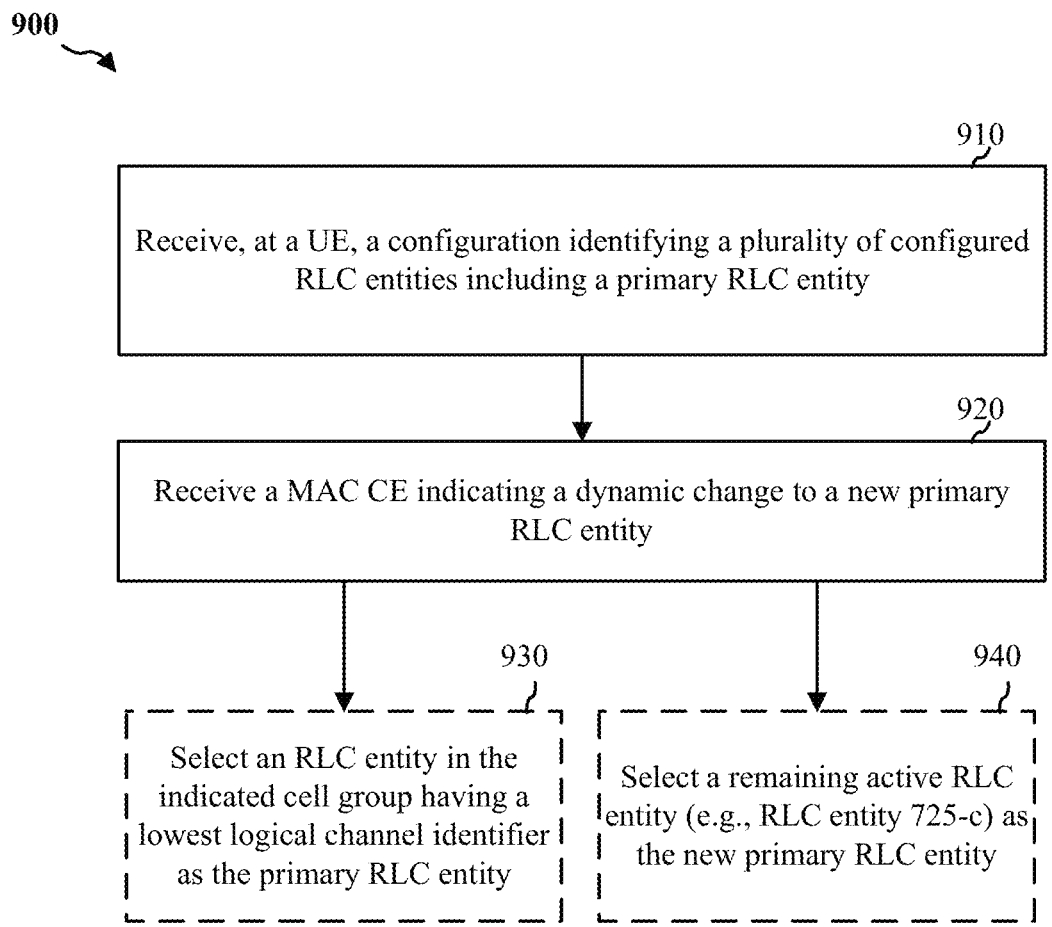
FIG. 9 is a flowchart of a method of setting a primary RLC entity in wireless communications.

FIG. 9 is a flowchart of a method 900 of wireless communication. The method may be performed by a UE (e.g., the UE 350 the apparatus 1102/1102'; the processing system 1214, which may include the memory 360 and which may be the entire UE 350 or a component of the UE 350 such as the TX processor 368, the RX processor 356, and/or the controller/processor 359).

At block 910, the method 900 may include receiving, at a UE, a configuration identifying a plurality of configured RLC entities including a primary RLC entity. In an aspect, for example, the PDCP duplication component 140 may receive, at the UE 104, a configuration identifying a plurality of configured RLC entities 625, 725 including a primary RLC entity (e.g., RLC entity 625-a).

At block 920, the method 900 may include receiving, a MAC CE indicating a dynamic change to a new primary RLC entity. In an aspect, for example, the PDCP duplication component 140 may receive a MAC CE (e.g., indication 660) indicating a dynamic change to a new primary RLC entity (e.g., RLC entity 625-c). In an implementation, the MAC-CE (e.g., indication 660) includes a field 664 or a bitmap explicitly indicating the new primary RLC entity. In another implementation, the MAC-CE (e.g., indication 780) includes a bit (e.g., field 784) indicating a cell group (e.g., MCG) for the new primary RLC entity. In an aspect, the method 900 may optionally include, at block 930, selecting an RLC entity in the indicated cell group having a lowest logical channel identifier as the primary RLC entity. In another implementation, the MAC-CE (e.g., indication 770) indicates deactivation of uplink PDCP duplication. In an aspect, the method 900 may optionally include, at block 940, selecting a remaining active RLC entity (e.g., RLC entity 725-c) as the new primary RLC entity.

Figure 10:
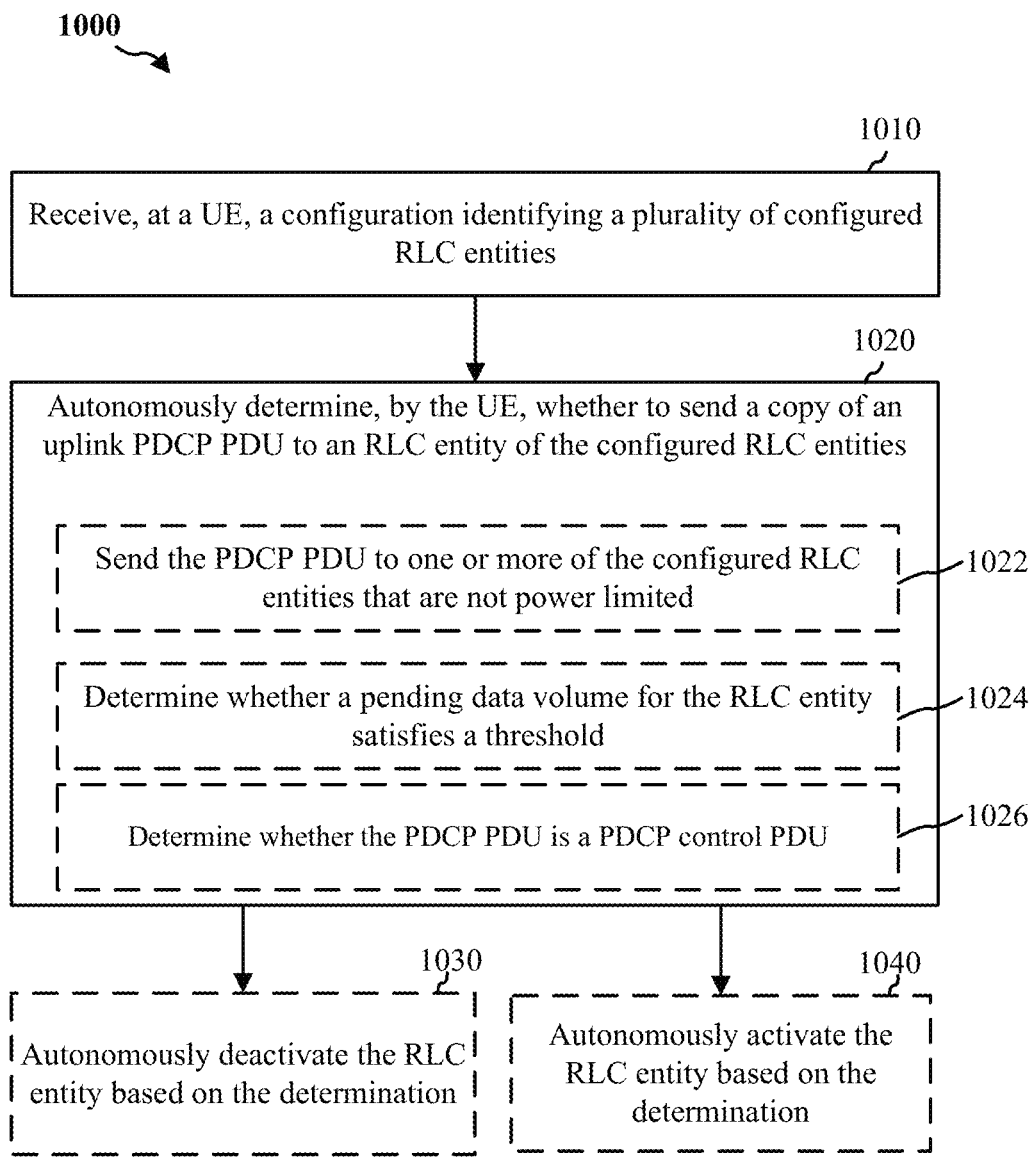
FIG. 10 is a flowchart of a method of autonomously determining RLC entities for PDCP duplication in wireless communications.

FIG. 10 is a flowchart of a method 1000 of wireless communication. The method may be performed by a UE (e.g., the UE 350 the apparatus 1102/1102'; the processing system 1214, which may include the memory 360 and which may be the entire UE 350 or a component of the UE 350 such as the TX processor 368, the RX processor 356, and/or the controller/processor 359).

At block 1010, the method 1000 may include receiving, at a UE, a configuration identifying a plurality of configured RLC entities. In an aspect, for example, the PDCP duplication component 140 may receive, at the UE 104, a configuration identifying a plurality of configured RLC entities 625, 725.

At block 1020, the method 1000 may include autonomously determining, by the user equipment, whether to send a copy of an uplink packet data convergence protocol (PDCP) protocol data unit (PDU) to an RLC entity of the configured RLC entities. In an aspect, for example, the PDCP duplication component 140 may autonomously determine whether to send a copy of an uplink PDCP PDU (e.g., uplink packet 645 or PDCP PDU 745) to an RLC entity 625, 725 of the configured RLC entities.

For example, at sub-block 1022, the block 1020 may include sending the PDCP PDU to one or more of the configured RLC entities that are not power limited. As another example, at sub-block 1024, the block 1020 may include determining whether a pending data volume for the RLC entity satisfies a threshold. As another example, at sub-block 1026, the block 1020 may include determining whether the PDCP PDU is a PDCP control PDU.

At block 1030, the method 1000 may optionally include autonomously deactivating the RLC entity based on the determination. In an aspect, for example, the PDCP duplication component 140 may autonomously deactivate the RLC entity based on the determination in block 1020.

At block 1040, the method 1000 may optionally include autonomously activating the RLC entity based on the determination. In an aspect, for example, the PDCP duplication component 140 may autonomously activate the RLC entity based on the determination in block 1020.

Figure 11:
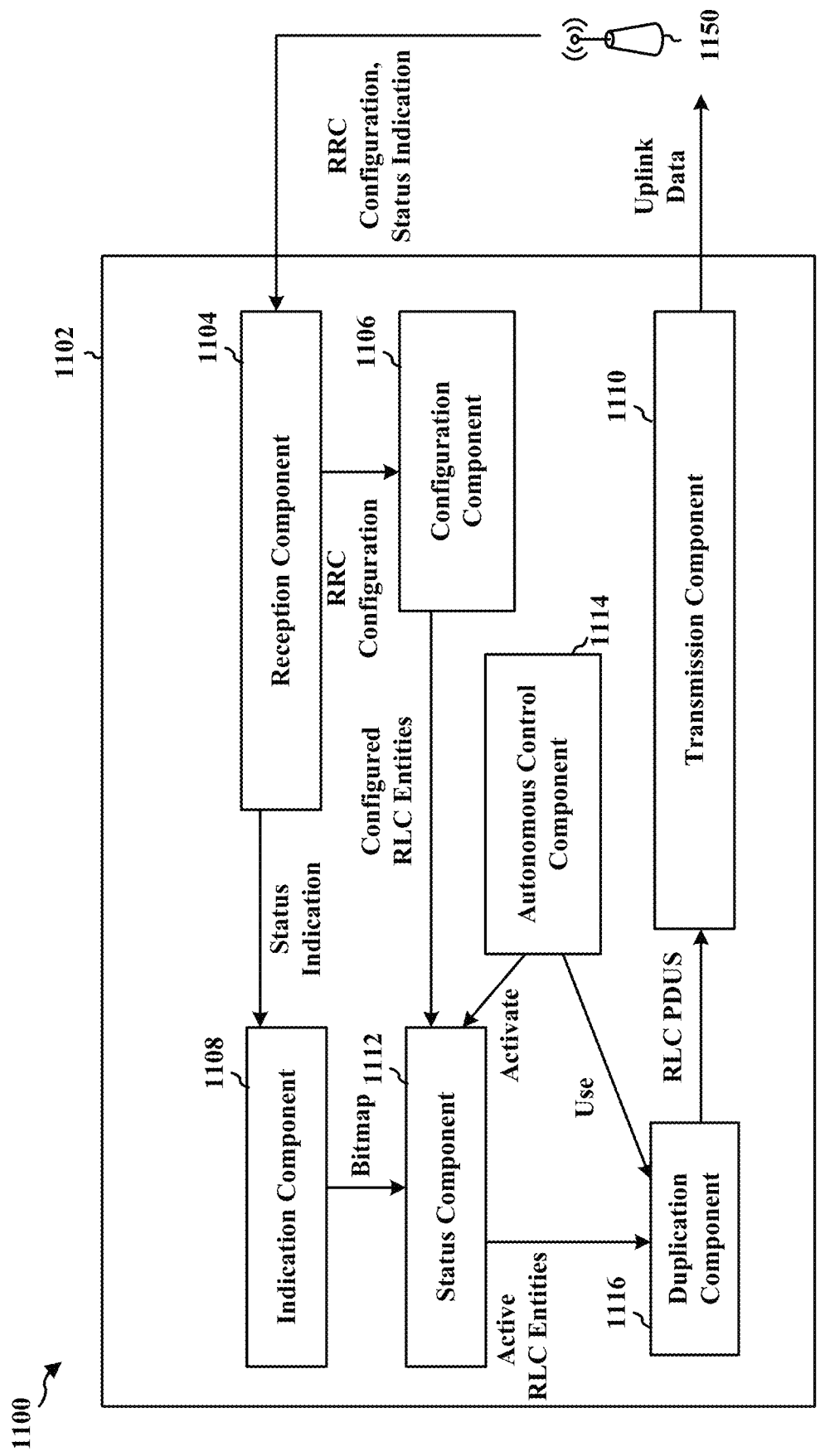
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus 1102 may be a UE. The apparatus 1102 includes a reception component 1104 that receives downlink signals from a base station 1150 including an RRC configuration and a status indication (e.g., a MAC CE), e.g., as described in connection with blocks 810, 820, 910, 920, and 1010. The apparatus 1102 includes a configuration component 1106 that receives a configuration of RLC entities e.g., as described in connection with blocks 810, 910, and 1010. The configuration component 1106 provides a set of configured RLC entities to the status component 1112. The apparatus includes an indication component 1108 that receives an indication of an activation status for one or more RLC entities e.g., as described in connection with blocks 820 and 920. The indication component 1108 provides a bitmap indicating a status of each RLC entity to the status component 1112. The apparatus includes a status component 1108 that receives an indication of an activation status for one or more RLC entities e.g., as described in connection with blocks 820 and 920. The status component 1108 provides an indication of active RLC entities to the duplication component 1116. The apparatus 1102 includes an autonomous control component 1114 that determines whether to use and/or activate an RLC entity e.g., as described in connection with blocks 1020. The autonomous control component 1114 provides an activate (or deactivate) signal to the status component 1112 or a use (or do not use) signal to the duplication component 1116. The apparatus 1102 includes a duplication component 1116 that generates an RLC PDU for each active and used RLC entity e.g., as described in connection with block 850. The apparatus 1102 includes a transmission component 1110 that transmits the RLC PDUs to one or more cell groups e.g., as described in connection with block 860.

The apparatus may include additional components that perform each of the blocks of the algorithm in the aforementioned flowcharts of FIGS. 8-10 As such, each block in the aforementioned flowcharts of FIGS. 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
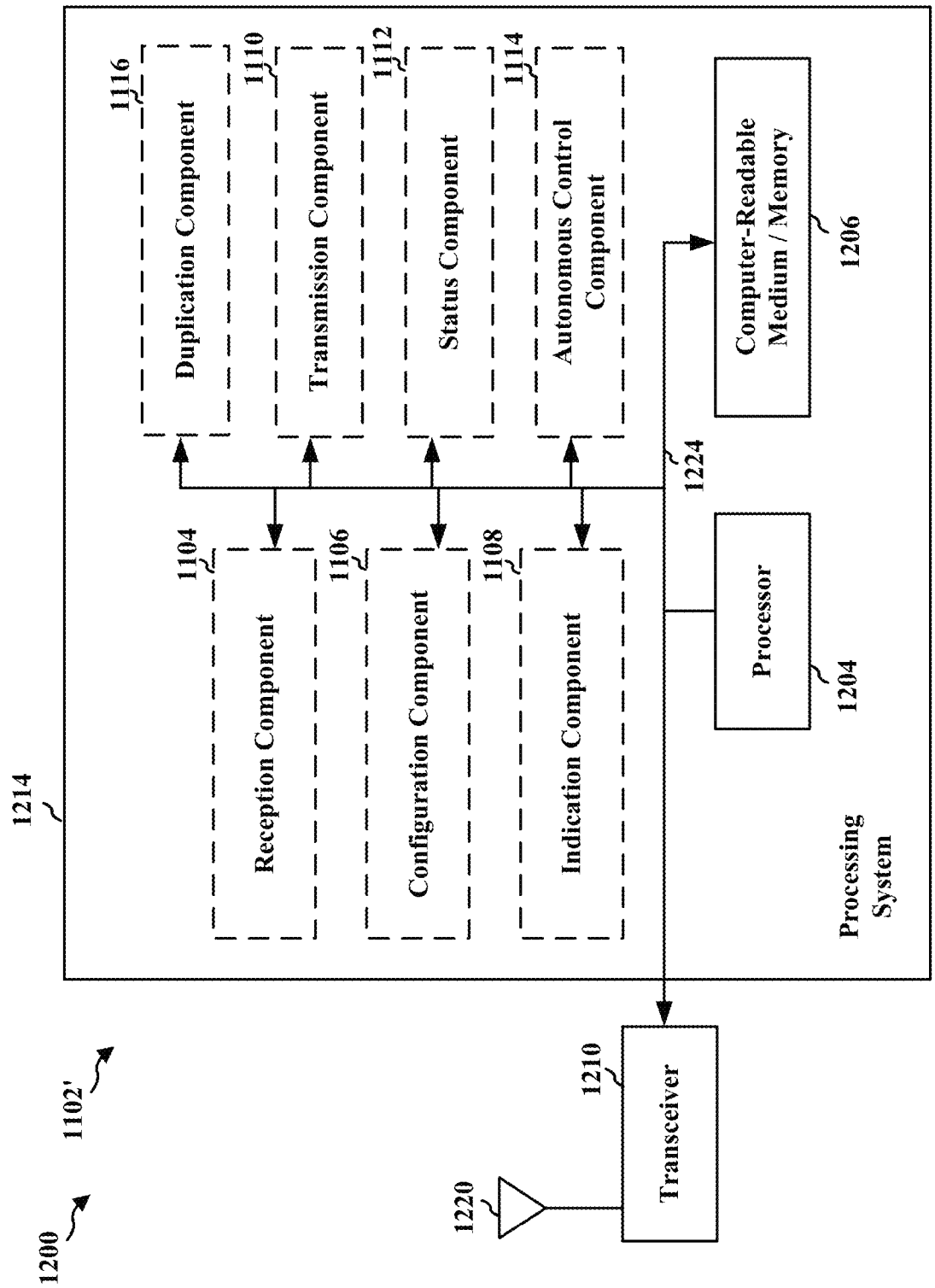
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for receiving, at a UE, a configuration for dual connectivity with a master cell group and with a secondary cell group, wherein the configuration identifies a plurality of configured RLC entities, each RLC entity being associated with one of the master cell group or the secondary cell group; means for receiving, at the UE, an indication of an activation status for each of at least a first subset of the configured RLC entities from one of the master cell group or the secondary cell group; means for setting the activation status of each of the first subset of the configured RLC entities that are associated with the cell group from which the indication is received based on the indication; means for duplicating, at the user equipment, an uplink PDCP PDU to a set of active RLC entities that are a subset of the configured RLC entities having an activation status set to active; means for transmitting an RLC PDU from each of the active RLC entities to a corresponding one of the master cell group or the secondary cell group; means for receiving, at a UE, a configuration identifying a plurality of configured RLC entities including a primary RLC entity; means for receiving a MAC CE indicating a dynamic change to a new primary RLC entity; means for receiving, at a user equipment, a configuration identifying a plurality of configured RLC entities; and means for autonomously determining, by the user equipment, whether to send a copy of an uplink PDCP PDU to an RLC entity of the configured RLC entities. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
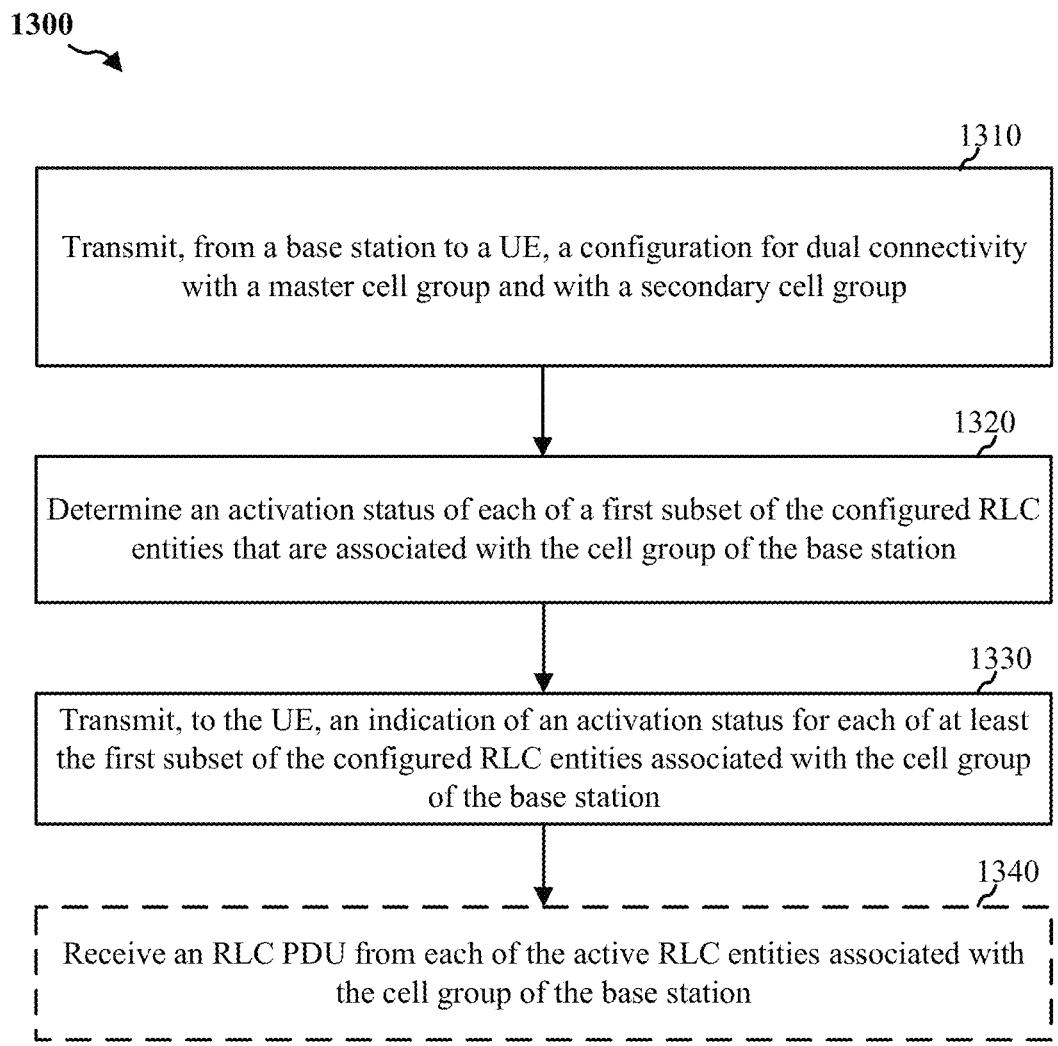
FIG. 13 is a flowchart of a method of indicating active RLC entities for PDCP duplication in wireless communications.

FIG. 13 is a flowchart of a method 1300 of wireless communication. The method may be performed by a base station 102 (e.g., the base station 310; the apparatus 1502/1502'; the processing system 1614, which may include the memory 376 and which may be the entire base station 310 or a component of the base station 310, such as the TX processor 316, the RX processor 370, and/or the controller/processor 375).

At block 1310, the method 1300 may include transmitting, from a base station to a UE, a configuration for dual connectivity with a master cell group and with a secondary cell group. In an aspect, for example, the base station 102 may transmit, to the UE 104, a configuration for dual connectivity with a master cell group and with a secondary cell group. The configuration may identify a plurality of configured RLC entities 725. Each RLC entity may be associated with one of the master cell group or the secondary cell group. The base station 102 is a member of one of the master cell group or the secondary cell group.

At block 1320, the method 1300 may include determining an activation status of each of a first subset of the configured RLC entities that are associated with the cell group of the base station. In an aspect, for example, the base station 102 may determine an activation status of each of a first subset (e.g., RLC entity 725-a and 725-b) of the configured RLC entities 725 that are associated with the cell group of the base station 102. For example, the base station 102 may determine the activation status of each RLC entity based on, for example, a channel quality associated with the RLC entity.

At block 1330, the method 1300 may include transmitting, to the UE, an indication of an activation status for each of at least the first subset of the configured RLC entities associated with the cell group of the base station. In an aspect, for example, the base station 102 may transmit, to the UE 104, an indication (e.g., indication 750, 760, 770, or 780) of an activation status for each of at least the first subset of the configured RLC entities 725 associated with the cell group of the base station 102. In an aspect, the indication (e.g., indication 750, 770, 780) includes an activation status for each of the configured RLC entities 725 (e.g., as a bitmap). In an implementation, when PDCP duplication is to remain active, the activation status is active for one or more configured RLC entities that are not associated with the cell group of the base station. In another aspect, the indication of the activation status (e.g., indication 770) indicates deactivation of PDCP duplication by indicating a single RLC entity (e.g., RLC entity 725-c) among the plurality of configured RLC entities 725 is active or by an additional indication 774 included in the indication. The indication 770 may be sent using a MAC CE and the additional indication 774 is sent using a bit in the MAC CE. In another aspect, the indication is sent using one of a DCI, MAC CE, RLC control PDU, a PDCP control PDU, or a RRC message. In certain aspects, depending on the value of the indication At block 1340, the method 1300 may optionally include receiving an RLC PDU from each of the active RLC entities associated with the cell group of the base station. In an aspect, for example, the base station 102 may receive an RLC PDU from each of the active RLC entities 725 associated with the cell group of the base station 102.

Figure 14:
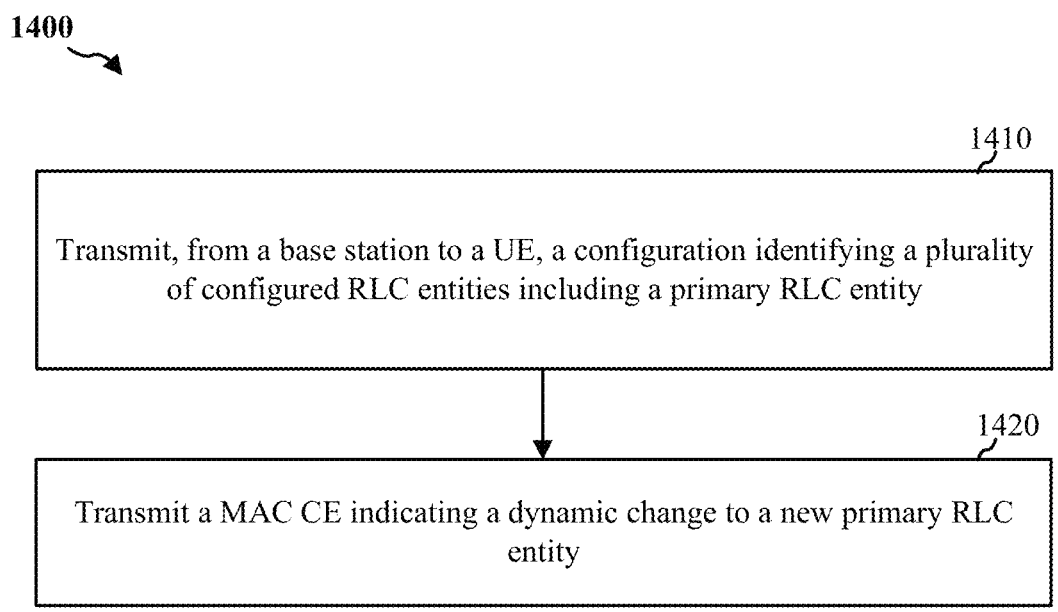
FIG. 14 is a flowchart of a method of indicating a primary RLC entity in wireless communications.

FIG. 14 is a flowchart of a method 1400 of wireless communication. The method may be performed by a base station 102 (e.g., the base station 310; the apparatus 1502/1502'; the processing system 1614, which may include the memory 376 and which may be the entire base station 310 or a component of the base station 310, such as the TX processor 316, the RX processor 370, and/or the controller/processor 375).

At block 1410, the method 1400 may include transmitting, from a base station to a UE, a configuration identifying a plurality of configured RLC entities including a primary RLC entity. In an aspect, for example, the base station 102 may transmit, to the UE 104, a configuration identifying a plurality of configured RLC entities 725 including a primary RLC entity (e.g., RLC entity 725-a).

At block 1420, the method 1400 may include transmitting, a MAC CE indicating a dynamic change to a new primary RLC entity. In an aspect, for example, the base station 102 may transmit the MAC CE (e.g., indication 660, 770, 780) indicating the dynamic change to a new primary RLC entity. For example, the MAC-CE (e.g., indication 660) may include a field 664 or a bitmap explicitly indicating the new primary RLC entity (e.g., RLC entity 725-c). As another example, the MAC-CE (e.g., indication 780) may include a bit (e.g., filed 784) indicating a cell group (e.g., MCG) for the new primary RLC entity, wherein the new primary RLC entity is an RLC entity in the indicated cell group having a lowest logical channel (e.g., RLC entity 725-a). As another example, the MAC-CE (e.g., indication 770) may indicate deactivation of uplink PDCP duplication and a remaining active RLC entity (e.g., RLC entity 725-c) is the new primary RLC entity.

Figure 15:
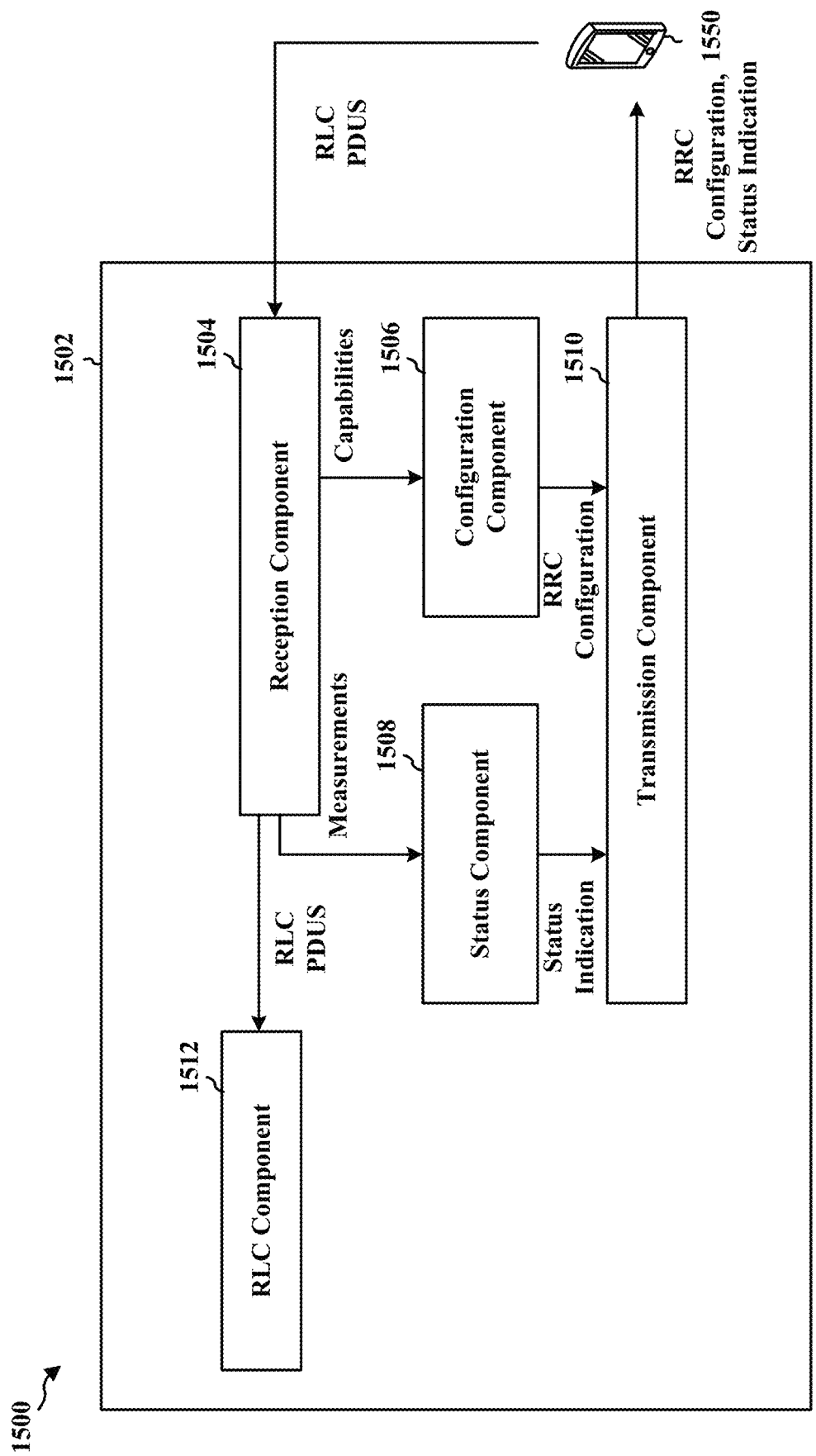
FIG. 15 is a conceptual data flow diagram illustrating the data flow between different means/components in an example base station.

FIG. 15 is a conceptual data flow diagram 1500 illustrating the data flow between different means/components in an example apparatus 1502. The apparatus may be a base station. The apparatus 1502 includes a reception component 1504 that receives uplink signals including RLC PDUS from a UE 1550 e.g., as described in connection with block 1340. The apparatus 1502 includes a configuration component 1506 that generates an RRC configuration e.g., as described in connection with blocks 1410 and 1420. The apparatus 1502 includes a status component 1508 that determines an activation status of one or more RLC entities e.g., as described in connection with block 1320. The status component 1508 may provide a status indication to the transmission component 1510. The apparatus 1502 includes a transmission component 1510 that transmits an RRC configuration and a status indication e.g., as described in connection with blocks 1310, 1330, 1410, and 1420. The apparatus 1502 includes an RLC component 1512 that receives and processes the RLC PDUs e.g., as described in connection with block 1340.

The apparatus may include additional components that perform each of the blocks of the algorithm in the aforementioned flowcharts of FIGS. 13 and 14 As such, each block in the aforementioned flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
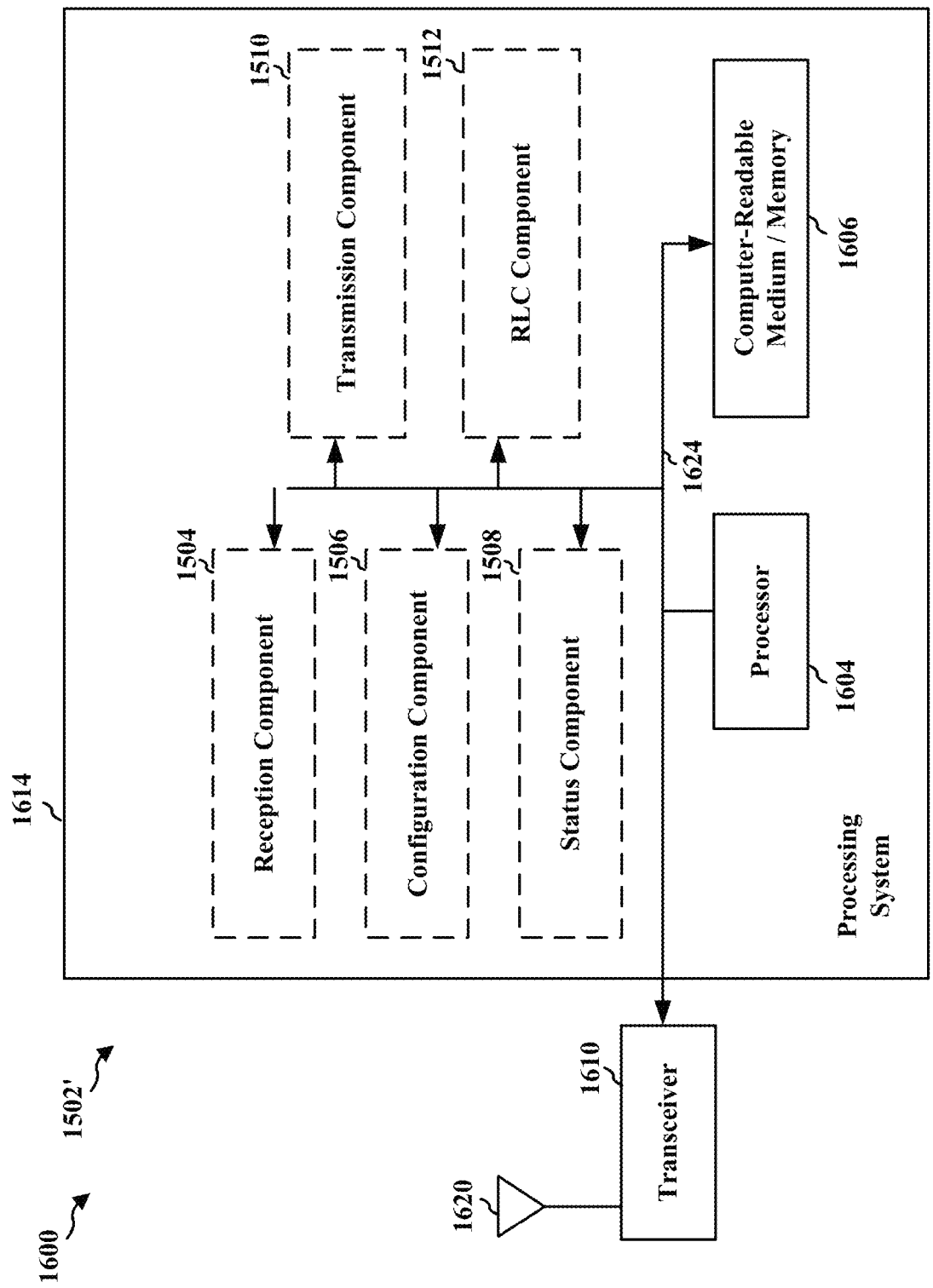
FIG. 16 is a diagram illustrating an example of a hardware implementation for an apparatus employing a processing system for a base station.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512. The components may be software components running in the processor 1604, resident/stored in the computer readable medium/memory 1606, one or more hardware components coupled to the processor 1604, or some combination thereof. The processing system 1614 may be a component of the base station 310 and may include the memory 376 and/or at least one of the TX processor 316, the RX processor 370, and the controller/processor 375. Alternatively, the processing system 1614 may be the entire base station (e.g., see 310 of FIG. 3).

In one configuration, the apparatus 1502/1502' for wireless communication includes means for transmitting, from a base station to a user equipment UE, a configuration for dual connectivity with a master cell group and with a secondary cell group, wherein the configuration identifies a plurality of configured RLC entities, each RLC entity being associated with one of the master cell group or the secondary cell group, wherein the base station is a member of one of the master cell group or the secondary cell group; means for determining an activation status of each of a first subset of the configured RLC entities that are associated with the cell group of the base station; means for transmitting, to the UE, an indication of an activation status for each of at least the first subset of the configured RLC entities associated with the cell group of the base station; means for receiving an RLC PDU from each of the active RLC entities associated with the cell group of the base station; means for transmitting, from a base station to a UE, a configuration identifying a plurality of configured RLC entities including a primary RLC entity; and means for transmitting a MAC CE indicating a dynamic change to a new primary RLC entity. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving, at a user equipment (UE), a configuration for dual connectivity with a master cell group and with a secondary cell group, wherein the configuration identifies a plurality of configured radio link control (RLC) entities, each RLC entity being associated with one of the master cell group or the secondary cell group;
   receiving, at the UE, an indication of an activation status for each of at least a first subset of the configured RLC entities from one cell group of the master cell group or the secondary cell group, wherein the indication includes an indicated activation status for each of the configured RLC entities; and
   setting the activation status of each of the first subset of the configured RLC entities that are associated with the one cell group from which the indication is received based on the indication, wherein the UE ignores the indicated activation status for one or more configured RLC entities that are associated with the cell group from which the indication is not received.

2. The method of claim 1, wherein the indicated activation status is active for one or more configured RLC entities associated with the cell group from which the indication is not received.

3. The method of claim 1, further comprising setting the activation status of each of a second subset of the configured RLC entities that are associated with the cell group from which the indication is not received based on the indication in response to determining that the indication of the activation status indicates that a single RLC entity among the plurality of configured RLC entities is active.

4. The method of claim 1, further comprising setting the activation status of each of a second subset of the configured RLC entities that are associated with the cell group from which the indication is not received based on an additional indication included in the indication, wherein the indication is sent using a media access control element (MAC CE) and the additional indication is sent using a bit in the MAC CE.

5. The method of claim 1, further comprising:
   duplicating, at the user equipment, an uplink packet data convergence protocol (PDCP) protocol data unit (PDU) to a set of active RLC entities that are a subset of the configured RLC entities having the activation status set to active; and
   transmitting an RLC protocol data unit (PDU) from each of the active RLC entities to a corresponding one of the master cell group or the secondary cell group.

6. The method of claim 1, wherein the master cell group is associated with a first base station and the secondary cell group is associated with a second base station.

7. The method of claim 1, wherein the indication is received from a MAC entity associated with the one cell group.

8. The method of claim 1, wherein the indication is sent using one of a downlink control information (DCI), MAC CE, RLC control PDU, a PDCP control PDU, or a radio resource control (RRC) message.

9. A method of wireless communication, comprising:
transmitting, from a base station to a user equipment (UE), a configuration for dual connectivity with a master cell group and with a secondary cell group, wherein the configuration identifies a plurality of configured radio link control (RLC) entities, each RLC entity being associated with one of the master cell group or the secondary cell group, wherein the base station is a member of one of the master cell group or the secondary cell group;
determining an activation status of each of a first subset of the configured RLC entities that are associated with the cell group of the base station; and
transmitting, to the UE, an indication of the activation status for each of at least the first subset of the configured RLC entities associated with the cell group of the base station, wherein the indication includes an indicated activation status for each of the configured RLC entities, wherein the indicated activation status is active for one or more configured RLC entities that are not associated with the cell group of the base station to indicate no change to the activation status of the one or more configured RLC entities that are not associated with the cell group of the base station.

10. The method of claim 9, wherein the indication of the activation status indicates deactivation of PDCP duplication by indicating a single RLC entity among the plurality of configured RLC entities is active.

11. The method of claim 9, wherein the indication of the activation status indicates deactivation of PDCP duplication by an additional indication included in the indication, wherein the indication is sent using a media access control element (MAC CE) and the additional indication is sent using a bit in the MAC CE.

12. The method of claim 9, further comprising receiving an RLC protocol data unit (PDU) from each of the active RLC entities associated with the cell group of the base station.

13. The method of claim 9, wherein the indication is sent using one of a downlink control information (DCI), MAC CE, RLC control PDU, a PDCP control PDU, or a radio resource control (RRC) message.

14. An apparatus of a user equipment (UE) for wireless communication, comprising:
a memory storing computer executable instructions; and
at least one processor coupled to the memory and configured to execute the instructions to:
receive a configuration for dual connectivity with a master cell group and with a secondary cell group, wherein the configuration identifies a plurality of configured radio link control (RLC) entities, each RLC entity being associated with one of the master cell group or the secondary cell group;
receive an indication of an activation status for each of at least a first subset of the configured RLC entities from one cell group of the master cell group or the secondary cell group, wherein the indication includes an indicated activation status for each of the configured RLC entities; and
set the activation status of each of the first subset of the configured RLC entities that are associated with the one cell group from which the indication is received based on the indication, wherein the UE ignores the indicated activation status for one or more configured RLC entities that are associated with the cell group from which the indication is not received.

15. The apparatus of claim 14, wherein the indicated activation status is active for one or more configured RLC entities associated with the cell group from which the indication is not received.

16. The apparatus of claim 14, wherein the at least one processor is configured to set the activation status of each of a second subset of the configured RLC entities that are associated with the cell group from which the indication is not received based on the indication in response to determining that the indication of the activation status indicates that a single RLC entity among the plurality of configured RLC entities is active.

17. The apparatus of claim 16, wherein the at least one processor is configured to set the activation status of each of a second subset of the configured RLC entities that are associated with the cell group from which the indication is not received based on an additional indication included in the indication, wherein the indication is sent using a media access control element (MAC CE) and the additional indication is sent using a bit in the MAC CE.

18. The apparatus of claim 14, wherein the at least one processor is configured to:
duplicate an uplink packet data convergence protocol (PDCP) protocol data unit (PDU) to a set of active RLC entities that are a subset of the configured RLC entities having the activation status set to active; and
transmit an RLC protocol data unit (PDU) from each of the active RLC entities to a corresponding one of the master cell group or the secondary cell group.

19. The apparatus of claim 14, wherein the master cell group is associated with a first base station and the secondary cell group is associated with a second base station.

20. The apparatus of claim 14, wherein the indication is received from a MAC entity associated with the one cell group.

21. The apparatus of claim 14, wherein the indication is sent using one of a downlink control information (DCI), MAC CE, RLC control PDU, a PDCP control PDU, or a radio resource control (RRC) message.

22. An apparatus for wireless communication, comprising:
a memory storing computer executable instructions; and
at least one processor coupled to the memory and configured to execute the instructions to:
transmit, from a base station to a user equipment (UE), a configuration for dual connectivity with a master cell group and with a secondary cell group, wherein the configuration identifies a plurality of configured radio link control (RLC) entities, each RLC entity being associated with one of the master cell group or the secondary cell group, wherein the base station is a member of one of the master cell group or the secondary cell group;
determine an activation status of each of a first subset of the configured RLC entities that are associated with the cell group of the base station; and
transmit, to the UE, an indication of the activation status for each of at least the first subset of the configured RLC entities associated with the cell group of the base station, wherein the indication includes an indicated activation status for each of the configured RLC entities, wherein the indicated activation status is active for one or more configured RLC entities that are not associated with the cell group of the base station to indicate no change to the activation status of the one or more configured RLC entities that are not associated with the cell group of the base station.

23. The apparatus of claim 22, wherein the at least one processor is configured to receive an RLC protocol data unit (PDU) from each of the active RLC entities associated with the cell group of the base station.

* * * * *